US012381357B2

(12) United States Patent
Murakami et al.

(10) Patent No.: US 12,381,357 B2
(45) Date of Patent: Aug. 5, 2025

(54) ELECTRICAL CONNECTOR AND ELECTRICAL CONNECTOR ASSEMBLY

(71) Applicant: Molex, LLC, Lisle, IL (US)

(72) Inventors: Kai Murakami, Yamato (JP); Hidehiro Matsushita, Yamato (JP); Kimiyasu Makino, Yamato (JP); Pei-Chun Wu, Shanghai (CN); Yueh-Ting Chiang, New Taipei (TW); Hoon-Chan Goh, Jurong Town (SG); Ser-Kiat Toh, Jurong Town (SG)

(73) Assignee: Molex, LLC, Lisle, IL (US)

( * ) Notice: Subject to any disclaimer, the term of this patent is extended or adjusted under 35 U.S.C. 154(b) by 556 days.

(21) Appl. No.: 17/740,361

(22) Filed: May 10, 2022

(65) Prior Publication Data

US 2022/0368078 A1 Nov. 17, 2022

(30) Foreign Application Priority Data

May 11, 2021 (CN) ......................... 202110510946.2

(51) Int. Cl.
*H01R 13/6471* (2011.01)
*H01R 13/422* (2006.01)
(Continued)

(52) U.S. Cl.
CPC ....... *H01R 13/6471* (2013.01); *H01R 13/422* (2013.01); *H01R 13/50* (2013.01); *H01R 12/716* (2013.01)

(58) Field of Classification Search
CPC ...... H01R 12/71; H01R 12/73; H01R 13/502; H01R 13/646; H01R 13/6461; H01R 4/66;
(Continued)

(56) References Cited

U.S. PATENT DOCUMENTS 7,309,239 B2 * 12/2007 Shuey ................ H01R 13/6471 439/74
10,522,948 B2 * 12/2019 Cho ................... H01R 13/6471
(Continued)

FOREIGN PATENT DOCUMENTS

CN 2603510 Y 2/2004
CN 201219153 Y 4/2009
(Continued)

*Primary Examiner* — Tulsidas C Patel
*Assistant Examiner* — Jeffrey Mountain

(57) ABSTRACT

An electrical connector and assembly are provided. The electrical connector includes an insulative base and terminal columns. Each terminal column includes ground terminals and differential signal terminal pairs, the terminal columns are spaced apart from each other. Each ground terminal has a body portion and three elastic contact portions. Each signal terminal of each differential signal terminal pair has a body portion and an elastic contact portion. In two adjacent terminal columns, orthographic projections of the two elastic contact portions of each differential signal terminal pair are positioned within a range defined by a width of the elastic contact portions of the corresponding ground terminal, and an orthographic projection of the elastic contact portion positioned in a middle of each around terminal in the second direction is positioned within a range defined by a width of the two elastic contact portions of the corresponding differential signal terminal pair.

19 Claims, 15 Drawing Sheets

(51) Int. Cl.
*H01R 13/50* (2006.01)
*H01R 12/71* (2011.01)

(58) Field of Classification Search
CPC .. H01R 13/6471; H01R 13/422; H01R 13/50; H01R 12/716; H01R 12/707; H01R 24/00; H01R 13/02; H01R 13/506; H01R 13/518; H01R 24/84; H01R 13/28
USPC .......................................................... 439/626
See application file for complete search history.

(56) References Cited

U.S. PATENT DOCUMENTS

| | | | | |
|---|---|---|---|---|
| 2007/0190825 | A1 | 8/2007 | Shuey et al. | |
| 2014/0017957 | A1* | 1/2014 | Horchler | H01R 13/631 439/680 |

FOREIGN PATENT DOCUMENTS

| | | | | | |
|---|---|---|---|---|---|
| CN | 104283043 | A | * | 1/2015 | H01R 13/02 |
| CN | 209298386 | | * | 8/2019 | H01R 12/716 |
| CN | 209298386 | U | * | 8/2019 | H01R 12/716 |
| TW | 200627733 | A | | 8/2006 | |

* cited by examiner

ELECTRICAL CONNECTOR AND ELECTRICAL CONNECTOR ASSEMBLY

RELATED APPLICATIONS

This application claims priority to Chinese Patent Application No. 202110510946.2 filed on May 11, 2021, which is incorporated herein by reference in its entirety.

TECHNICAL FIELD

The present disclosure relates to an electrical connector, and particularly relates to an electrical connector and an electrical connector assembly which are used for high-speed transmission of a signal.

BACKGROUND ART

As transmission speed of a signal becomes faster, in order to promote integrity of the signal, it may need to further reduce crosstalk in transmission of the signal. However, existing electrical connectors still are not sufficient to do so. Moreover, because structure strength of an insulative base of the existing electrical connector is not good, the insulative base is prone to generate warpage deformation in a process of passing through a soldering furnace, which thus affects soldering quality between terminals and a circuit board.

SUMMARY

Therefore, one of objects of the present disclosure is to provide an electrical connector which can overcome at least one deficiency of the existing technology.

Accordingly, an electrical connector of the present disclosure comprises an insulative base and a plurality of terminal columns. The plurality of terminal columns are provided to the insulative base, each terminal column comprises a plurality of ground terminals and a plurality of differential signal terminal pairs, the plurality of ground terminals and the plurality of differential signal terminal pairs are arranged alternately along a first direction, the plurality of terminal columns are arranged along a second direction perpendicular to the first direction and are spaced apart from each other. Each ground terminal has a body portion and three elastic contact portions which extend from the body portion and are spaced apart from each other. Each differential signal terminal pair is composed of two signal terminals, each signal terminal has a body portion and an elastic contact portion which extends from the body portion. In two adjacent terminal columns, orthographic projections of two elastic contact portions of each differential signal terminal pair in the second direction are positioned within a range defined by a width of the three elastic contact portions of a corresponding ground terminal, and an orthographic projection of an elastic contact portion positioned in a middle of each ground terminal in the second direction is positioned within a range defined by a width of the two elastic contact portions of a corresponding differential signal terminal pair.

In some embodiments, each ground terminal further has three tail portions which extend from the body portion and are spaced apart from each other, the three tail portions and the three elastic contact portion of each ground terminal respectively extend from two opposite ends of the body portion; each signal terminal of each differential signal terminal pair further has a tail portion which extends from the body portion, the tail portion and the elastic contact portion of each signal terminal respectively extend from two opposite ends of the body portion; in the two adjacent terminal columns, orthographic projections of the two tail portions of each differential signal terminal pair in the second direction are positioned within a range defined by a width of the three tail portions of the corresponding ground terminal, and an orthographic projection of the tail portion positioned in a middle of each ground terminal in the second direction is positioned within a range defined by a width of the two tail portions of the corresponding differential signal terminal pair.

In some embodiments, the insulative base has a bottom wall, the bottom wall has a first side and a second side which are substantially parallel to the first direction and positioned at two opposite ends of the bottom wall; the insulative base further has a plurality of protruding bars which are substantially parallel to each other, are spaced apart from each other, protrude from the bottom wall, are positioned between the first side and the second side, extend along the first direction, and are elongated; the bottom wall and the plurality of protruding bars together define a plurality of inserting slots, the plurality of protruding bars and the plurality of inserting slots are arranged alternately along the second direction; the insulative base further has a wall surface of each protruding bar adjacent to one of plurality of the inserting slots to be provided with a plurality of ground terminals grooves which respectively receive the plurality of ground terminals of each terminal column and signal terminal grooves which respectively receive the signal terminals of each terminal column.

In some embodiments, the insulative base further has recessed avoiding portions which respectively correspond to the elastic contact portions of the plurality of ground terminals of each terminal column in position and recessed avoiding portions which respectively correspond to the elastic contact portions of the signal terminals of each terminal column in position; each protruding bar is provided with protruding blocks integrally extending from each protruding bar in the recessed avoiding portions which respectively correspond to the elastic contact portion of each signal terminal and/or the elastic contact portion positioned in the middle of each ground terminal.

In some embodiments, the first side and the second side of the insulative base each are formed with a foolproof protruding portion and a foolproof recessed portion which are adjacent to each other.

In some embodiments, the bottom wall has a third side and a fourth side which are substantially parallel to the second direction and are positioned at two opposite ends of the bottom wall; the insulative base further has a protruding rib which is formed to the third side and protrudes from the bottom wall.

In some embodiments, the protruding rib extends to the first side and the second side; the first side and the second side of the insulative base each are formed with a foolproof protruding portion and a foolproof recessed portion which are adjacent to each other, the foolproof recessed portion is positioned between the protruding rib and the foolproof protruding portion.

In some embodiments, the insulative base has two terminal providing zones which are spaced apart from each other along the first direction and an isolating zone which is positioned between the two terminal providing zones; the plurality of protruding bars and the plurality of inserting slots of each terminal providing zone are arranged alternately along the second direction, and the plurality of protruding bars of one terminal providing zone of the two terminal providing zones respectively correspond to the plurality of inserting slots of the other terminal providing zone of the two terminal providing zones in the first direction.

In some embodiments, the plurality of ground terminals are first ground terminals, each terminal column further comprises a second ground terminal, the second ground terminal has a body portion and an elastic contact portion which extends from the body portion; in the two adjacent terminal columns of the plurality of terminal columns, an arrangement manner of one terminal column is that one second ground terminal, one differential signal terminal pair, one first ground terminal, one differential signal terminal pair and one first ground terminal are arranged from left to right along the first direction, and an arrangement manner of the other terminal column is that one first ground terminal, one differential signal terminal pair, one first around terminal, one differential signal terminal pair and one second ground terminal are arranged from left to right along the first direction.

In some embodiments, the plurality of ground terminals are first ground terminals, each terminal column further comprises a second ground terminal, the second ground terminal has a body portion and an elastic contact portion which extend from the body portion, the second ground terminal is provided to be adjacent to the corresponding differential signal terminal pair and be positioned at an outermost tip end position in each terminal column.

In some embodiments, the insulative base has a first side and a second side which are substantially parallel to the first direction and are positioned at two opposite ends of the insulative base, a third side and a fourth side which are substantially parallel to the second direction and are positioned at two opposite ends of the insulative base, and a protruding rib which is formed to the third side; lengths of the first side and the second side along the first direction are shorter than lengths of the third side and the fourth side along the second direction.

Another one of objects of the present disclosure is to provide an electrical connector assembly which can overcome at least one deficiency of the existing technology.

Accordingly, an electrical connector assembly of the present disclosure comprises two electrical connectors which have similar construction and are mated with each other. Each electrical connector comprises an insulative base and a plurality of terminal columns. The plurality of terminal columns are provided to the insulative base, each terminal column comprises a plurality of ground terminals and a plurality of differential signal terminal pairs, the plurality of ground terminals and the plurality of differential signal terminal pairs are arranged alternately along a first direction, the plurality of terminal columns are arranged along a second direction substantially perpendicular to the first direction and being spaced apart from each other. Each ground terminal has a body portion and three elastic contact portions which extend from the body portion and are spaced apart from each other. Each differential signal terminal pair is composed of two signal terminals, each signal terminal has a body portion and an elastic contact portion which extends from the body portion. In two adjacent terminal columns, orthographic projections of two elastic contact portions of each differential signal terminal pair in the second direction are positioned within a range defined by a width of the three elastic contact portions of a corresponding ground terminal, and an orthographic projection of the orthographic projections of the elastic contact portion positioned in a middle of each ground terminal in the second direction is positioned within a range defined by a width of the two elastic contact portions of the corresponding differential signal terminal pair.

In some embodiments, each ground terminal further has three tail portions which extend from the body portion and are spaced apart from each other, the three tail portions and the three elastic contact portion of each ground terminal respectively extend from two opposite ends of the body portion; each signal terminal of each differential signal terminal pair further has a tail portion which extends from the body portion, the tail portion and the elastic contact portion of each signal terminal respectively extend from two opposite ends of the body portion. In two adjacent terminal columns, orthographic projections of two tail portions of each differential signal terminal pair in the second direction are positioned within a range defined by a width of the three tail portions of a corresponding ground terminal, and an orthographic projection of the tail portion positioned in a middle of each ground terminal in the second direction is positioned within a range defined by a width of the two tail portions of the corresponding differential signal terminal pair.

In some embodiments, the insulative base has a bottom wall, the bottom wall has a first side and a second side which are substantially parallel to the first direction and positioned at two opposite ends of the bottom wall. The insulative base further has a plurality of protruding bars which are substantially parallel to each other, are spaced apart from each other, protrude from the bottom wall, are positioned between the first side and the second side, extend along the first direction, and are elongated; the bottom wall and the plurality of protruding bars together define a plurality of inserting slots, the plurality of protruding bars and the plurality of inserting slots are arranged alternately along the second direction. The insulative base further has a wall surface of each protruding bar adjacent to one of the plurality of the inserting slots to be provided with a plurality of ground terminals grooves which respectively receive the plurality of ground terminals of each terminal column and signal terminal grooves which respectively receive the signal terminals of each terminal column.

In some embodiments, in the two electrical connectors mated with each other, the protruding bars of one electrical connector are correspondingly inserted into the inserting slots of the other electrical connector respectively.

In some embodiments, the insulative base further has recessed avoiding portions which respectively correspond to the elastic contact portions of the plurality of ground terminals of each terminal column in position and recessed avoiding portions which respectively correspond to the elastic contact portions of the signal terminals of each terminal column in position; each protruding bar is provided with protruding blocks integrally extending from each protruding bar in the recessed avoiding portions which respectively correspond to the elastic contact portion of each signal terminal and/or the elastic contact portion positioned in the middle of each ground terminal.

In some embodiments, the first side and the second side of the insulative base each are formed with a foolproof protruding portion and a foolproof recessed portion which are adjacent to each other.

In some embodiments, the bottom wall has a third side and a fourth side which are substantially parallel to the second direction and are positioned at two opposite ends of the bottom wall; the insulative base further has a protruding rib which is formed to the third side and protrudes from the bottom wall.

In some embodiments, the protruding rib extends to the first side and the second side; the first side and the second side of the insulative base each are formed with a foolproof protruding portion and a foolproof recessed portion which are adjacent to each other, the foolproof recessed portion is positioned between the protruding rib and the foolproof protruding portion.

In some embodiments, in the two electrical connectors mated with each other, each foolproof protruding portion of one electrical connector is mated with the corresponding foolproof recessed portion of the other electrical connector, the protruding rib of one electrical connector is mated with the fourth side of the other electrical connector, and the foolproof protruding portions and the protruding ribs of the two electrical connectors cooperate with each other to make a periphery edge of each electrical connector closed.

In some embodiments, the insulative base has two terminal providing zones which are spaced apart from each other along the first direction and an isolating zone which is positioned between the two terminal providing zones; the protruding bars and the inserting slots of each terminal providing zone are arranged alternately along the second direction, and the protruding bars of one terminal providing zone of the two terminal providing zones respectively correspond to the inserting slots of the other terminal providing zone of the two terminal providing zones in the first direction.

In some embodiments, the plurality of ground terminals are first ground terminals; each terminal column further comprises a second ground terminal, the second ground terminal has a body portion and an elastic contact portion which extends from the body portion; in the two adjacent terminal columns of the plurality of terminal columns, an arrangement manner of one terminal column is that one second ground terminal, one differential signal terminal pair, one first ground terminal, one differential signal terminal pair and one first ground terminal are arranged from left to right along the first direction, and an arrangement manner of the other terminal column is that one first ground terminal, one differential signal terminal pair, one first ground terminal, one differential signal terminal pair and one second around terminal are arranged from left to right along the first direction.

In some embodiments, the plurality of ground terminals are first ground terminals; each terminal column further comprises a second ground terminal, the second ground terminal has a body portion and an elastic contact portion which extend from the body portion, the second around terminal is provided to be adjacent to the corresponding differential signal terminal pair and be positioned at an outermost tip end position in each terminal column.

In some embodiments, the insulative base has a first side and a second side which are substantially parallel to the first direction and are positioned at two opposite ends of the insulative base, a third side and a fourth side which are substantially parallel to the second direction and are positioned at two opposite ends of the insulative base, and a protruding rib which is formed to the third side; lengths of the first side and the second side along the first direction are shorter than lengths of the third side and the fourth side along the second direction.

In some embodiments, in the two the electrical connectors mated with each other, the two corresponding first ground terminals are mated with each other so that mating of each pair of the three pairs of the elastic contact portions of the two corresponding first ground terminals forms two contact points, the two corresponding signal terminals are mated with each other so that mating of the elastic contact portions of the two corresponding signal terminals forms two contact points.

Accordingly, an electrical connector assembly of the present disclosure comprises two electrical connectors which have the same construction and are mated with each other. Each electrical connector comprises an insulative base; and a plurality of terminal columns. The plurality of terminal columns are provided to the insulative base, each terminal column comprises a plurality of ground terminals and a plurality of differential signal terminal pairs, the plurality of ground terminals and the plurality of differential signal terminal pairs are arranged alternately along a first direction, the plurality of terminal columns are arranged along a second direction substantially perpendicular to the first direction and being spaced apart from each other. The insulative base has a bottom wall, the bottom wall has a first side and a second side which are substantially parallel to the first direction and positioned at two opposite ends of the bottom wall; the insulative base further has a plurality of protruding bars which are substantially parallel to each other, are spaced apart from each other, protrude from the bottom wall, are positioned between the first side and the second side, extend along the first direction, and are elongated; the bottom wall and the plurality of protruding bars together define a plurality of inserting slots; the insulative base has two terminal providing zones which are spaced apart from each other along the first direction and an isolating zone which is positioned between the two terminal providing zones; the protruding bars and the inserting slots of each terminal providing zone are arranged alternately along the second direction, and the protruding bars of one terminal providing zone of the two terminal providing zones respectively correspond to the inserting slots of the other terminal providing zone of the two terminal providing zones in the first direction.

In some embodiments, in the two electrical connectors mated with each other, the protruding bars of one electrical connector are correspondingly inserted into the inserting slots of the other electrical connector respectively.

In some embodiments, each differential signal terminal pair is composed of two signal terminals; the insulative base further has a wall surface of each protruding bar adjacent to the inserting slot to be provided with a plurality of ground terminals grooves which respectively receive the plurality of ground terminals of each terminal column and signal terminal grooves which respectively receive the signal terminals of each terminal column.

In some embodiments, the terminal columns correspondingly provided in the one terminal providing zone of the two terminal providing zones are used to transmit a signal, the terminal columns correspondingly provided in the other terminal providing zone of the two terminal providing zones are used to receive a signal.

In some embodiments, the first side and the second side of the insulative base each are formed with a foolproof protruding portion and a foolproof recessed portion which are adjacent to each other.

In some embodiments, the bottom wall has a third side and a fourth side which are substantially parallel to the second direction and are positioned at two opposite ends of the bottom wall; the insulative base further has a protruding rib which is formed to the third side and protrudes from the bottom wall.

In some embodiments, the protruding rib extends to the first side and the second side; the first side and the second side of the insulative base each are formed with a foolproof protruding portion and a foolproof recessed portion which are adjacent to each other, the foolproof recessed portion is positioned between the protruding rib and the foolproof protruding portion.

In some embodiments, in the two electrical connectors mated with each other, each foolproof protruding portion of one electrical connector is mated with the corresponding foolproof recessed portion of the other electrical connector, the protruding rib of one electrical connector is mated with the fourth side of the other electrical connector, and the foolproof protruding portions and the protruding ribs of the two electrical connectors cooperate with each other to make a periphery edge of each electrical connector closed.

In some embodiments, the bottom wall has a third side and a fourth side which are substantially parallel to the second direction and are positioned at two opposite ends of the bottom wall; the insulative base further has a protruding rib which is formed to the third side and protrudes from the bottom wall; lengths of the first side and the second side along the first direction are shorter than lengths of the third side and the fourth side along the second direction.

Accordingly, an electrical connector of the present disclosure comprises an insulative base, at least three differential signal terminal groups and at least one second ground terminal. The at least three differential signal terminal groups are provided to the insulative base and staggeringly distributed in two columns which are substantially parallel to each other, in the three differential signal terminal groups, the two differential signal terminal groups are provided to a first column of the two columns, the other differential signal terminal group is provided to a second column of the two columns and is positioned between the two differential signal terminal groups provided in the first column, each differential signal terminal group comprises two first ground terminals and one differential signal terminal pair which are arranged side by side, the two first ground terminals are respectively positioned at two outer sides of the differential signal terminal pair. The at least one second ground terminal is provided to the insulative base and is positioned between the two differential signal terminal groups provided in the first column, the second ground terminal is adjacent to the two corresponding first ground terminals of the two differential signal terminal groups and faces the differential signal terminal pair of the differential signal terminal group provided in the second column.

In some embodiments, the second ground terminal and the two adjacent corresponding first ground terminals are connected with each other and share at least one tail portion.

In some embodiments, the two differential signal terminal groups provided in the first column are arranged along a first direction, the first column and the second column are arranged along a second direction substantially perpendicular to the first direction and are spaced apart from each other; the insulative base has a bottom wall, the bottom wall has a first side and a second side which are parallel to the first direction and positioned at two opposite ends of the bottom wall; the insulative base further has a plurality of protruding bars which are substantially parallel to each other, are spaced apart from each other, protrude from the bottom wall, are positioned between the first side and the second side, extend along the first direction, and are elongated; the bottom wall and the plurality of protruding bars together define a plurality of inserting slots, the plurality of protruding bars and the plurality of inserting slots are arranged alternately along the second direction.

In some embodiments, each differential signal terminal pair is composed of from two signal terminals, each signal terminal has an elastic contact portion, each first ground terminal and the second ground terminal each have an elastic contact portion; the insulative base further has recessed avoiding portions which respectively correspond to the elastic contact portions of the first ground terminals and the elastic contact portion of the second ground terminal in position and recessed avoiding portions which respectively correspond to the elastic contact portions of the signal terminals in position; each protruding bar is provided with protruding blocks integrally extending from each protruding bar in the recessed avoiding portions which respectively correspond to the elastic contact portion of each signal terminal and/or the elastic contact portion of the second around terminal.

In some embodiments, the first side and the second side of the insulative base each are formed with a foolproof protruding portion and a foolproof recessed portion which are adjacent to each other.

In some embodiments, the bottom wall has a third side and a fourth side which are substantially parallel to the second direction and are positioned at two opposite ends of the bottom wall; the insulative base further has a protruding rib which is formed to the third side and protrudes from the bottom wall.

In some embodiments, the protruding rib extends to the first side and the second side; the first side and the second side of the insulative base each are formed with a foolproof protruding portion and a foolproof recessed portion which are adjacent to each other, the foolproof recessed portion is positioned between the protruding rib and the foolproof protruding portion.

In some embodiments, when the electrical connector and another electrical connector having the same construction as the electrical connector are mated with each other, each foolproof protruding portion of one electrical connector is mated with the corresponding foolproof recessed portion of the other electrical connector, the protruding rib of one electrical connector is mated with the fourth side of the other electrical connector, and the foolproof protruding portions and the protruding ribs of the two electrical connectors cooperate with each other to make a periphery edge of each electrical connector closed.

In some embodiments, the insulative base has two terminal providing zones which are spaced apart from each other along the first direction and an isolating zone which is positioned between the two terminal providing zones; the protruding bars and the inserting slots of each terminal providing zone are arranged alternately along the second direction, and the protruding bars of one terminal providing zone of the two terminal providing zones respectively correspond to the inserting slots of the other terminal providing zone of the two terminal providing zones in the first direction.

In some embodiments, an arrangement manner of the first column is that one first ground terminal, one differential signal terminal pair, one first ground terminal, one second ground terminal, one first ground terminal, one differential signal terminal pair and one first ground terminal are arranged from left to right along a first direction, an arrangement manner of the second column is that one first ground terminal, one differential signal terminal pair and one first ground terminal are arranged from left to right along the first direction, and the first column and the second column are arranged along a second direction substantially perpendicular to the first direction and are spaced apart from each other.

In some embodiments, the at least three differential signal terminal groups provided in the first column are arranged along a first direction, the first column and the second column are arranged along a second direction substantially perpendicular to the first direction and are spaced apart from each other; the insulative base has a first side and a second side which are substantially parallel to the first direction and are positioned at two opposite ends of the insulative base, a third side and a fourth side which are parallel to the second direction and are positioned at two opposite ends of the insulative base, and a protruding rib which is formed to the third side; lengths of the first side and the second side along the first direction are shorter than lengths of the third side and the fourth side along the second direction.

The present disclosure at least has the following effects: crosstalk between the differential signal terminal pairs of adjacent terminal columns can be reduced, integrity of the signal is increased. Moreover, the protruding rib can promote the structure strength of the insulative base in a length direction, which can reduce warpage deformation of the insulative base generated in the process of passing through the soldering furnace, so as to promote the soldering quality between the terminals of the terminal columns and the circuit board.

BRIEF DESCRIPTION OF THE DRAWINGS

Other features and effects of the present disclosure will be apparent from embodiments illustrated in the drawings, in which.

DETAILED DESCRIPTION OF THE PREFERRED EMBODIMENTS

Figure 1:
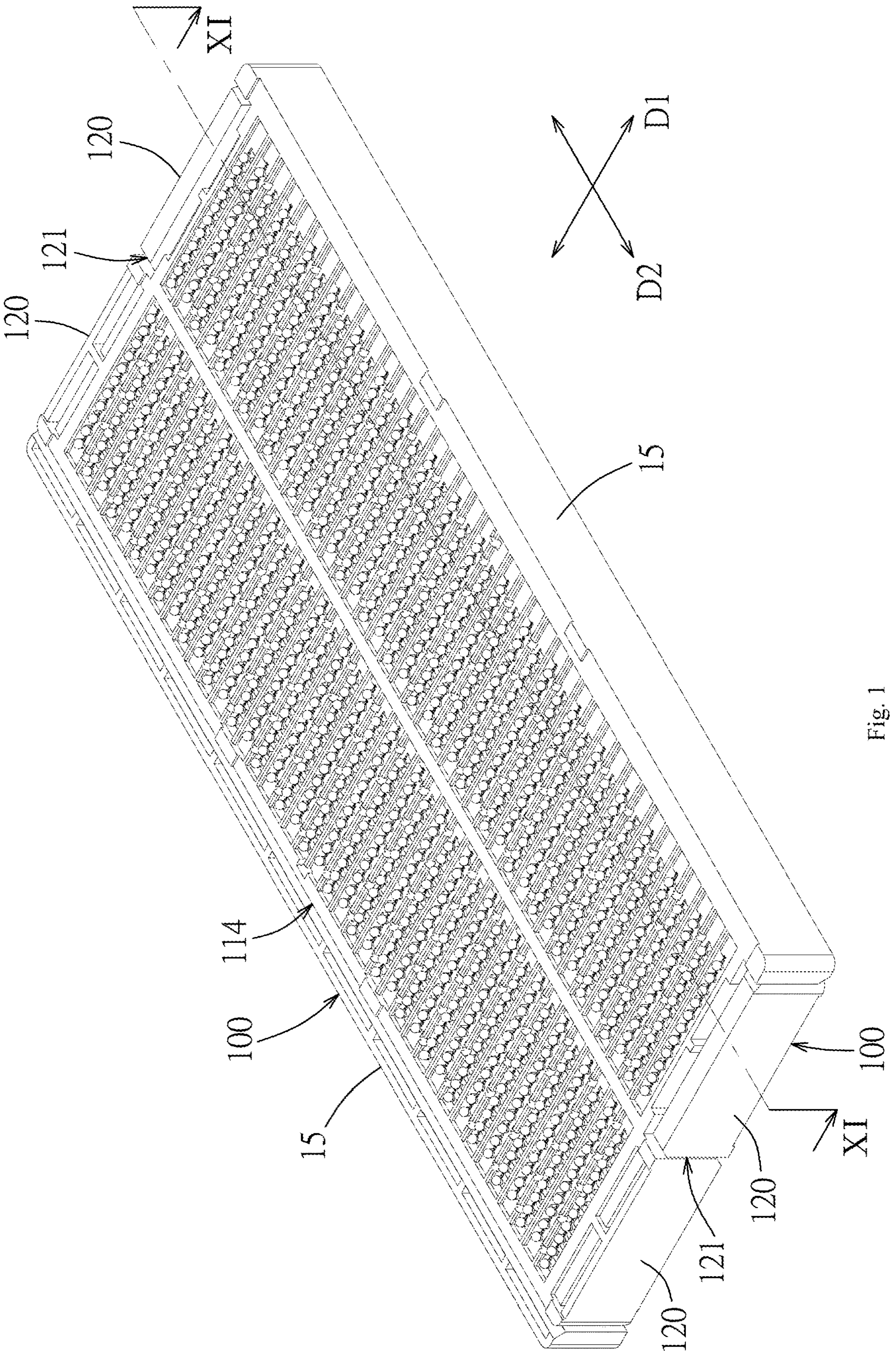
FIG. 1 is a perspective view of a first embodiment of an electrical connector assembly of the present disclosure illustrating that two electrical connectors are mated with each other.
Figure 2:
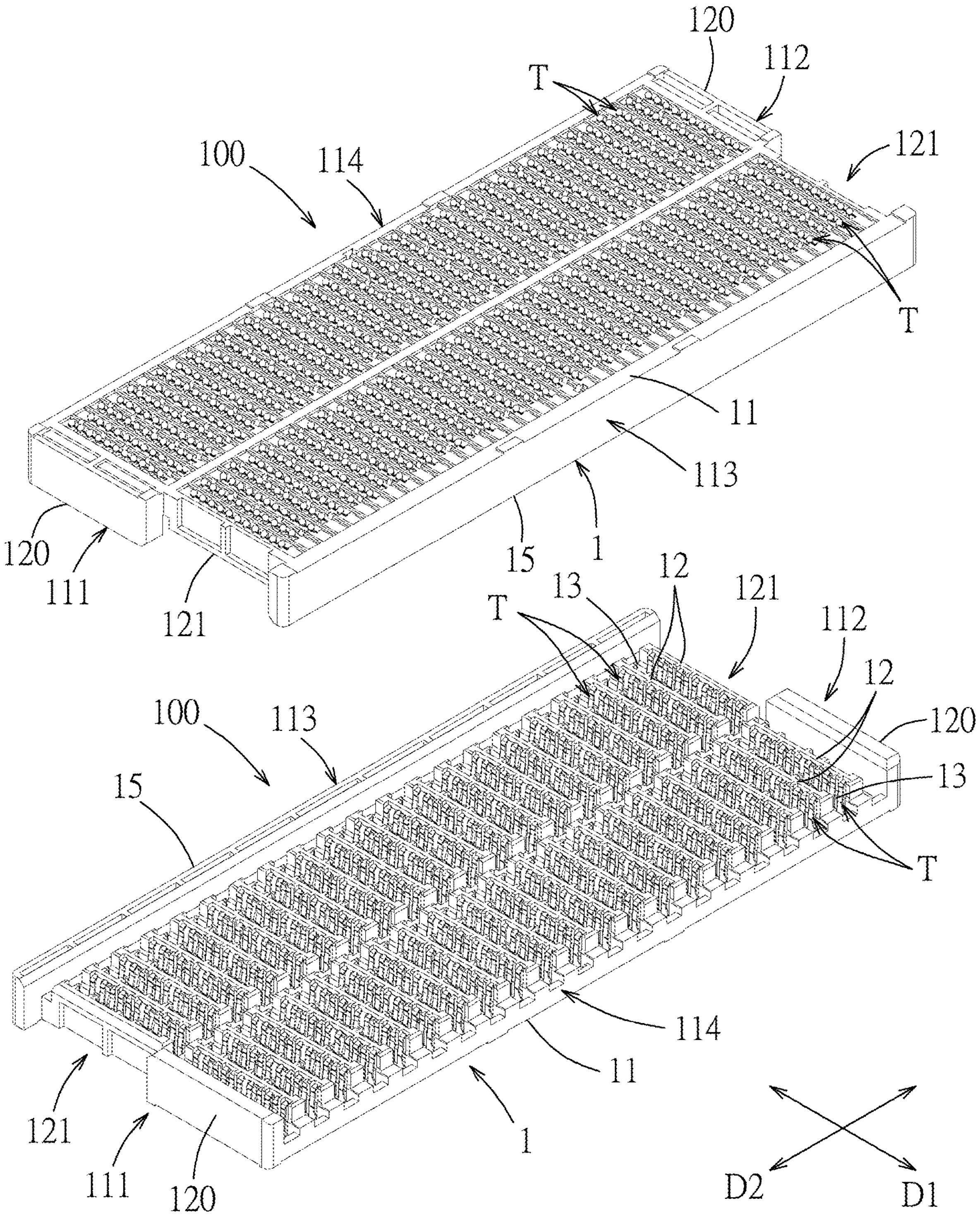
FIG. 2 is a perspective exploded view of the first embodiment.
Figure 3:
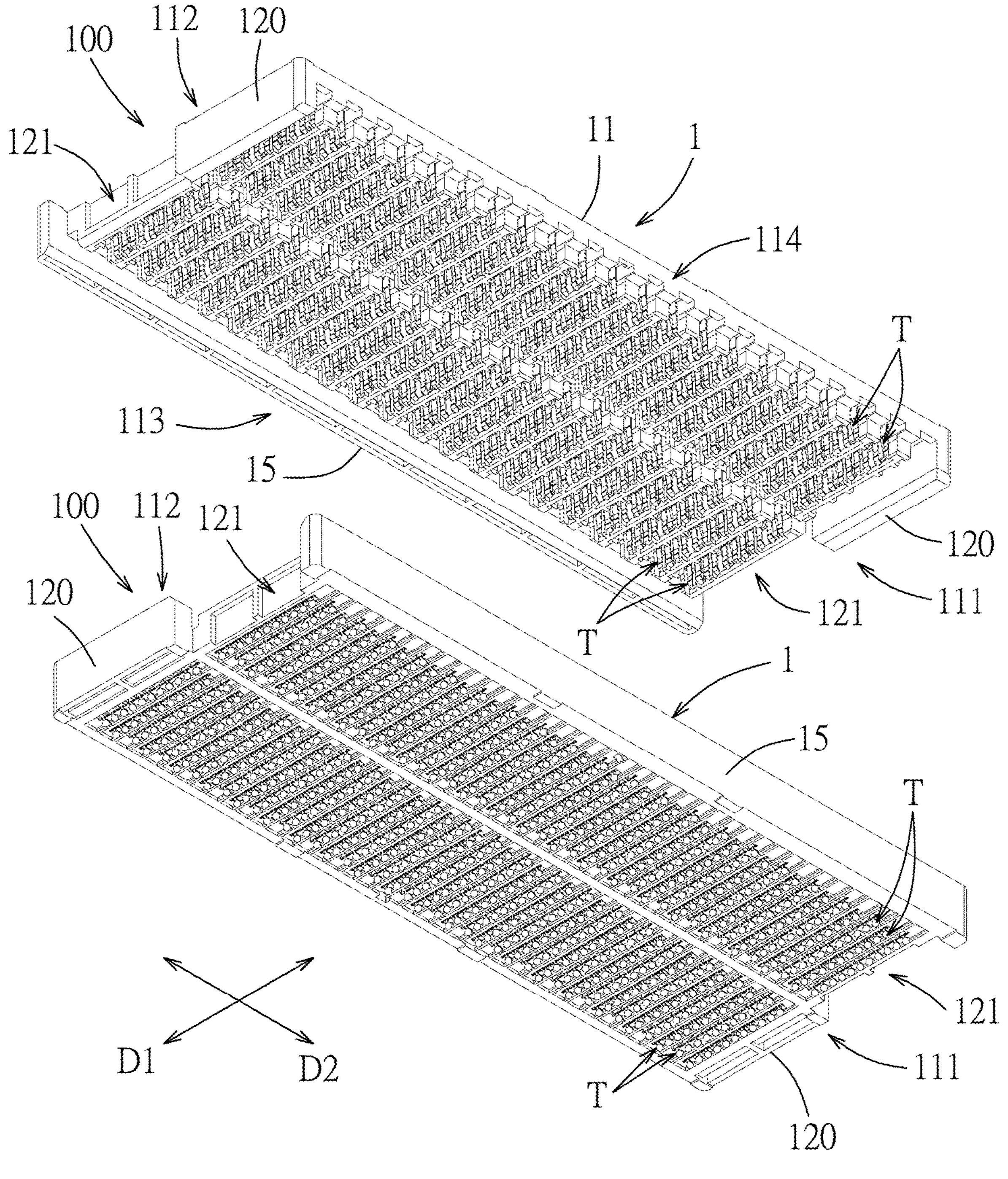
FIG. 3 is a perspective exploded view of the first embodiment viewed from another angle.

Referring to FIG. 1, FIG. 2 and FIG. 3, a first embodiment of an electrical connector assembly of the present disclosure includes two electrical connectors 100 which have the same construction and mate with each other, each electrical connector 100 includes an insulative base 1 and a plurality of terminal columns T provided to the insulative base 1.

Figure 4:
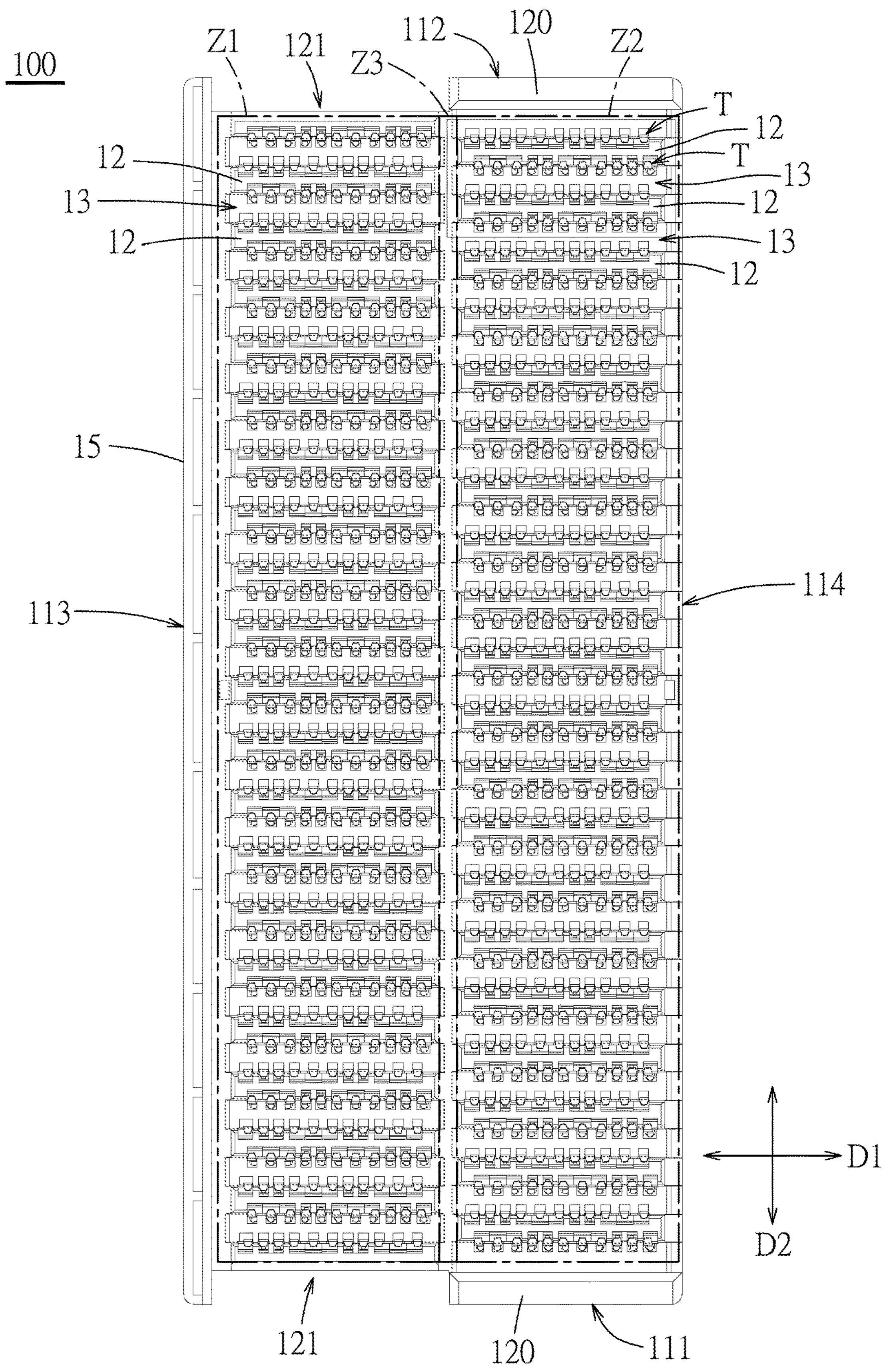
FIG. 4 is a top view of the electrical connector of the first embodiment.
Figure 5:
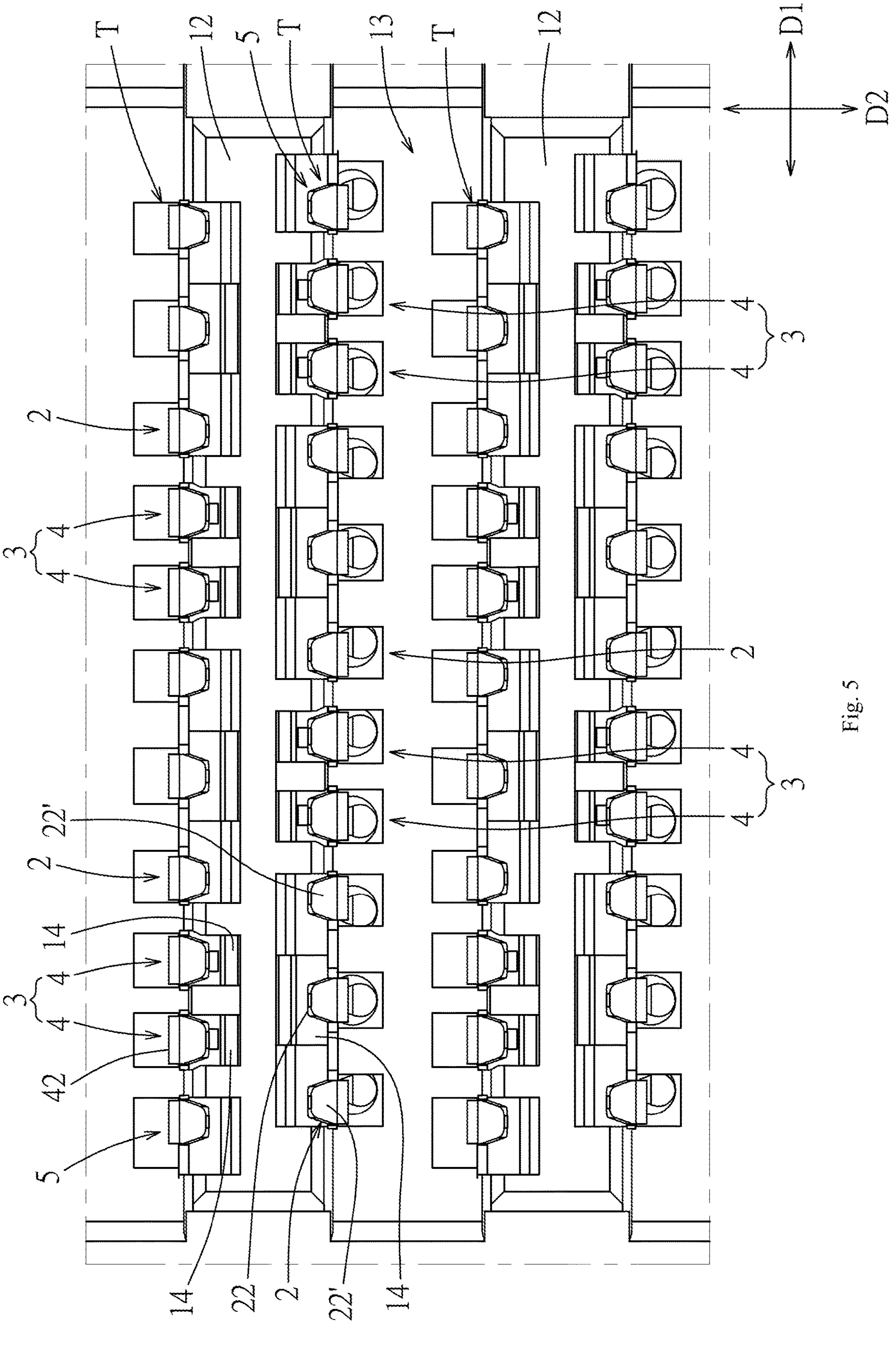
FIG. 5 is a partially enlarged view of FIG. 4.

Referring to FIG. 2, FIG. 4 and FIG. 5, the insulative base 1 is made of an insulative material, such as a plastic for example, and has a bottom wall 11 and a plurality of protruding bars 12 provided to the bottom wall 11. The bottom wall 11 has a first side 111 and a second side 112 which are substantially parallel to a first direction D1 and are positioned at two substantially opposite ends of the bottom wall 11 and a third side 113 and a fourth side 114 which are substantially parallel to a second direction D2 substantially perpendicular to the first direction D1 and are positioned at two opposite ends of the bottom wall 11. Lengths of the first side 111 and the second side 112 along the first direction D1 are shorter than lengths of the third side 113 and the fourth side 114 along the second direction D2, so that the bottom wall 11 is a substantially rectangular structure. The plurality of protruding bars 12 are substantially parallel to each other, are spaced apart from each other, protrude from the bottom wall 11, are positioned between the first side 111 and the second side 112, extend along the first direction D1, and are elongated. The bottom wall 11 and the plurality of protruding bars 12 together define a plurality of inserting slots 13, the plurality of protruding bars 12 and the plurality of inserting slots 13 are arranged alternately along the second direction D2.

Each terminal column T includes a plurality of first ground terminals 2 and a plurality of differential signal terminal pairs 3. The plurality of first ground terminals 2 and the plurality of differential signal terminal pairs 3 are arranged alternately along the first direction D1. A wall surface of each protruding bar 12 substantially adjacent to the corresponding inserting slot 13 is provided with one corresponding terminal column T so that the plurality of terminal columns T are arranged along the second direction D2 and are spaced apart from each other.

Figure 6:
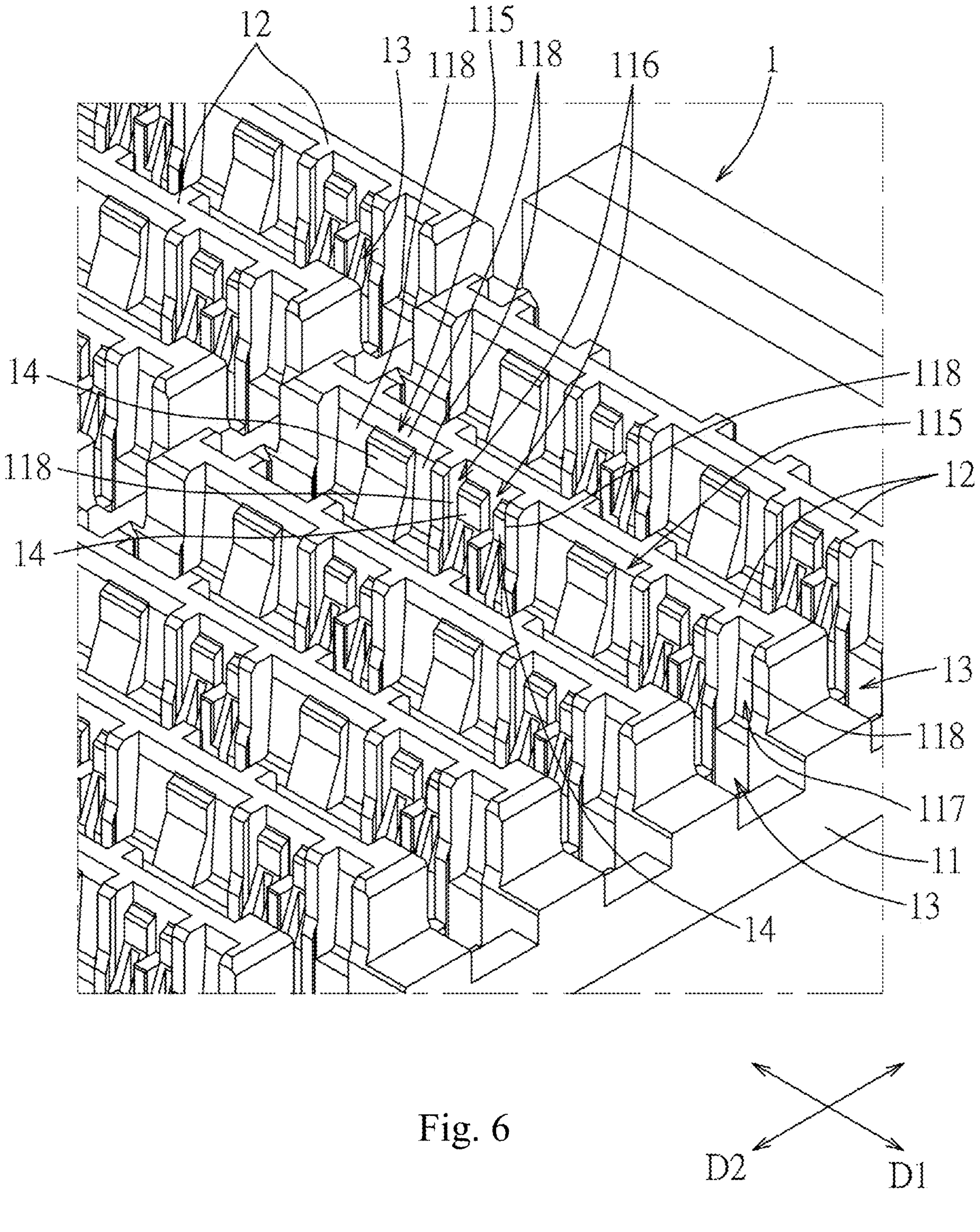
FIG. 6 is a partially enlarged view of an insulative base of the electrical connector of the first embodiment.
Figure 7:
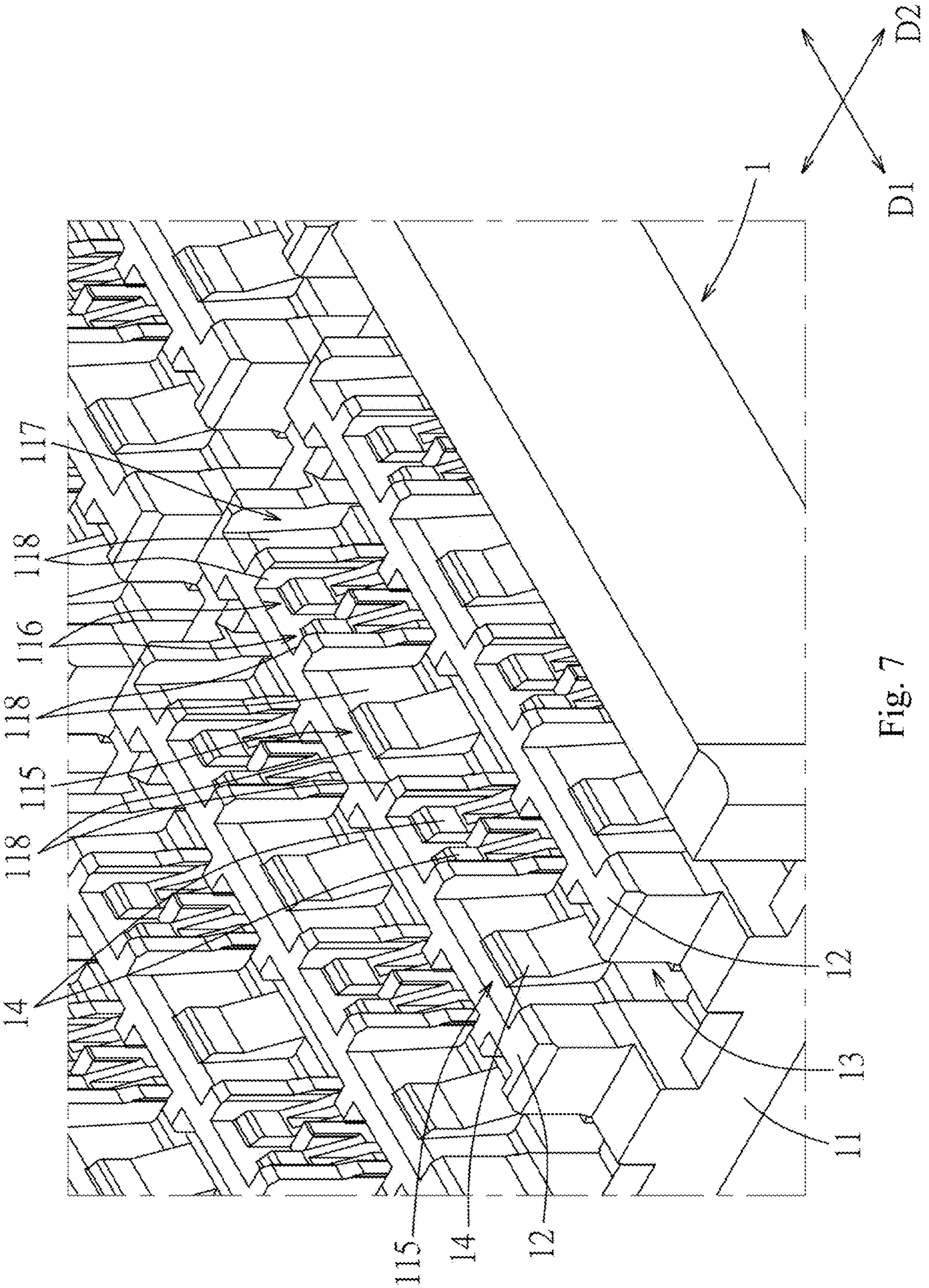
FIG. 7 is a partially enlarged view of the insulative base of the electrical connector of the first embodiment viewed from another angle.
Figure 8:
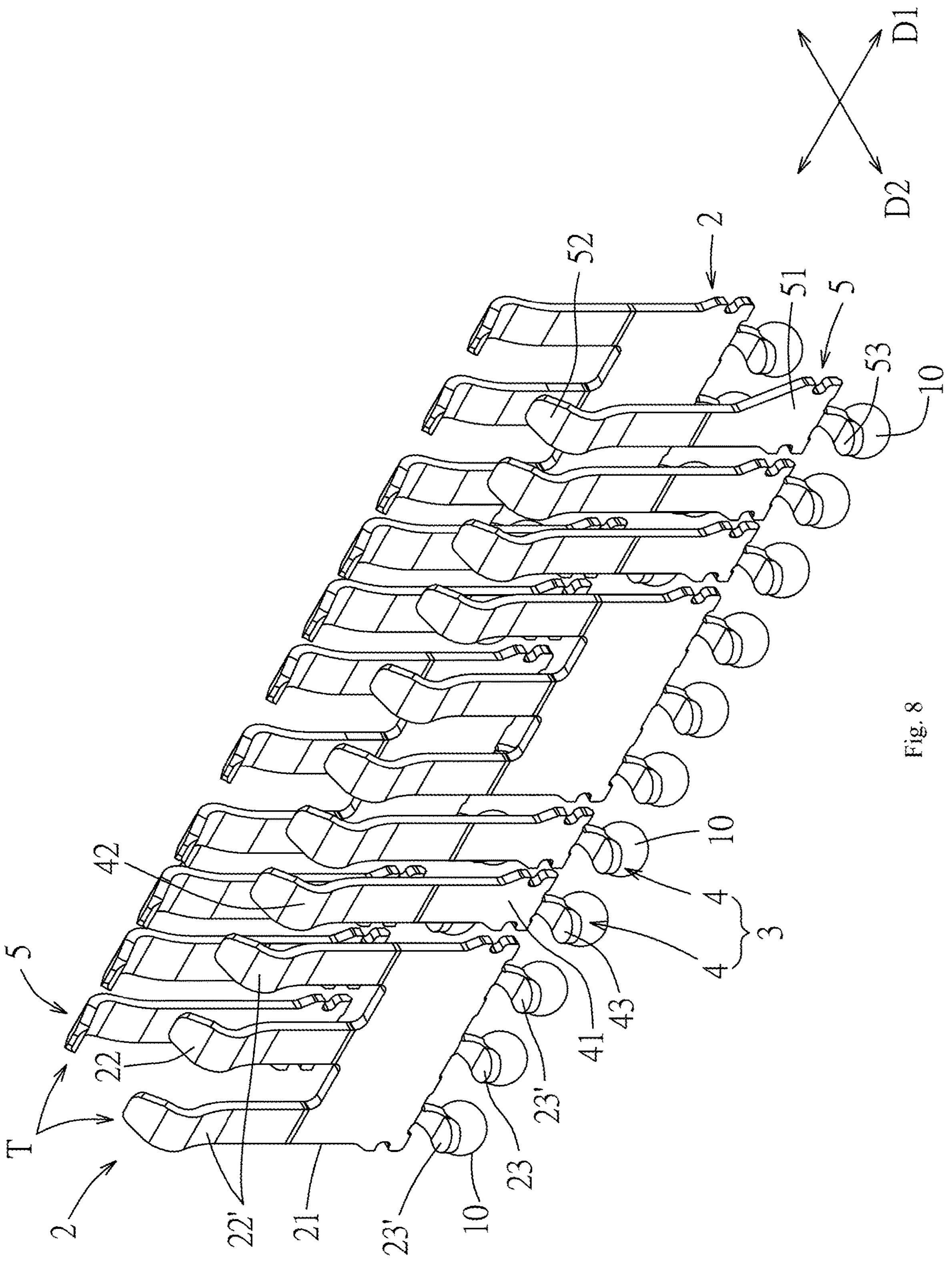
FIG. 8 is a perspective view of some of a plurality of terminal columns of the electrical connector of the first embodiment.

Referring to FIG. 6, FIG. 7, FIG. 8 and FIG. 9, each first ground terminal 2 has a body portion 21 which is used to interfere or otherwise sit within with the insulative base 1, three elastic contact portions 22, 22' which are spaced apart from each other and extend from the body portion 21 and three tail portions 23, 23' which are spaced apart from each other and extend from the body portion 21. The three tail portions 23, 23' and the three elastic contact portions 22, 22' respectively extend from two opposite ends of the body portion 21. Taking the orientation as shown in FIG. 8, the three tail portions 23, 23' bend downwardly from a bottom end of the body portion 21 at a right angle, extend and can be exposed to the bottom wall 11, each tail portion 23, 23' is used to allow a solder ball 10 to be soldered therewith. Here, the tail portion 23 is a middle tail portion positioned in a middle of the three tail portions 23, 23', and the two tail portions 23' are spaced apart by the tail portion 23 and are respectively positioned at opposite sides of the tail portion 23, each tail portion 23' is a lateral tail portion adjacent to a lateral edge of the body portion 21. The three elastic contact portions 22, 22' extend upwardly from a top end of the body portion 21, here, the elastic contact portion 22 is a middle elastic contact portion positioned in a middle of the three elastic contact portions 22, 22', and the two elastic contact portions 22' are spaced apart by the elastic contact portion 22 and are respectively positioned at opposite sides of the elastic contact portion 22, each elastic contact portion 22' is a lateral elastic contact portion adjacent to a lateral edge of the body portion 21.

Each differential signal terminal pair 3 is composed of two signal terminals 4, each signal terminal 4 has a body portion 41 which is used to interfere with the insulative base 1, an elastic contact portion 42 which extends from the body portion 41 and a tail portion 43 which extends from the body portion 41. The tail portion 43 and the elastic contact portion 42 respectively extend from two opposite ends of the body portion 41. Taking the orientation as shown in FIG. 8, the tail portion 43 bends downwardly from a bottom end of the body portion 41 by a right angle, extends and can be exposed to the bottom wall 11, the tail portion 43 is used to allow a solder ball 10 to be soldered therewith. The elastic contact portion 42 extends upwardly from a top end of the body portion 41.

In the first embodiment, each terminal column T further includes one second ground terminal 5. The second ground terminal 5 has a body portion 51 which is used to interfere with the insulative base 1, an elastic contact portion 52 which extends from the body portion 51 and a tail portion 53 which extends from the body portion 51. The tail portion 53 and the elastic contact portion 52 respectively extend from two opposite ends of the body portion 51. Taking the orientation as shown in FIG. 8, the tail portion 53 bends downwardly from a bottom end of the body portion 51 by a right angle, extends and can be exposed to the bottom wall 11, the tail portion 53 is used to allow a solder ball 10 to be soldered therewith. The elastic contact portion 52 extends upwardly from the body portion 51.

The insulative base 1 further has the wall surface of each protruding bar 12 adjacent to the inserting slot 13 to be provided with a plurality of first ground terminals grooves 115 which respectively receive the plurality of first ground terminals 2 of each terminal column T, signal terminal grooves 116 which respectively receive the signal terminals 4 of each terminal column T, a second ground terminal groove 117 which respectively receives the second ground terminal 5 each terminal column T, and recessed avoiding portions 118 which respectively correspond to the elastic contact portions 22, 22', 42, 52 of each terminal column T in position.

Each first ground terminal 2 is inserted into the corresponding first ground terminal groove 115 from down to up, by that the body portion 21 interferes with the insulative base 1, each first ground terminal 2 is fixed in the corresponding first ground terminal groove 115. Each signal terminal 4 is inserted into the corresponding signal terminal groove 116 from down to up, by that the body portion 41 interferes with the insulative base 1, each signal terminal 4 is fixed in the corresponding signal terminal groove 116. Each second ground terminal 5 is inserted into the corresponding second ground terminal groove 117 from down to up, by that the body portion 51 interferes with the insulative base 1, each second ground terminal 5 is fixed in the corresponding second ground terminal groove 117.

Figure 10:
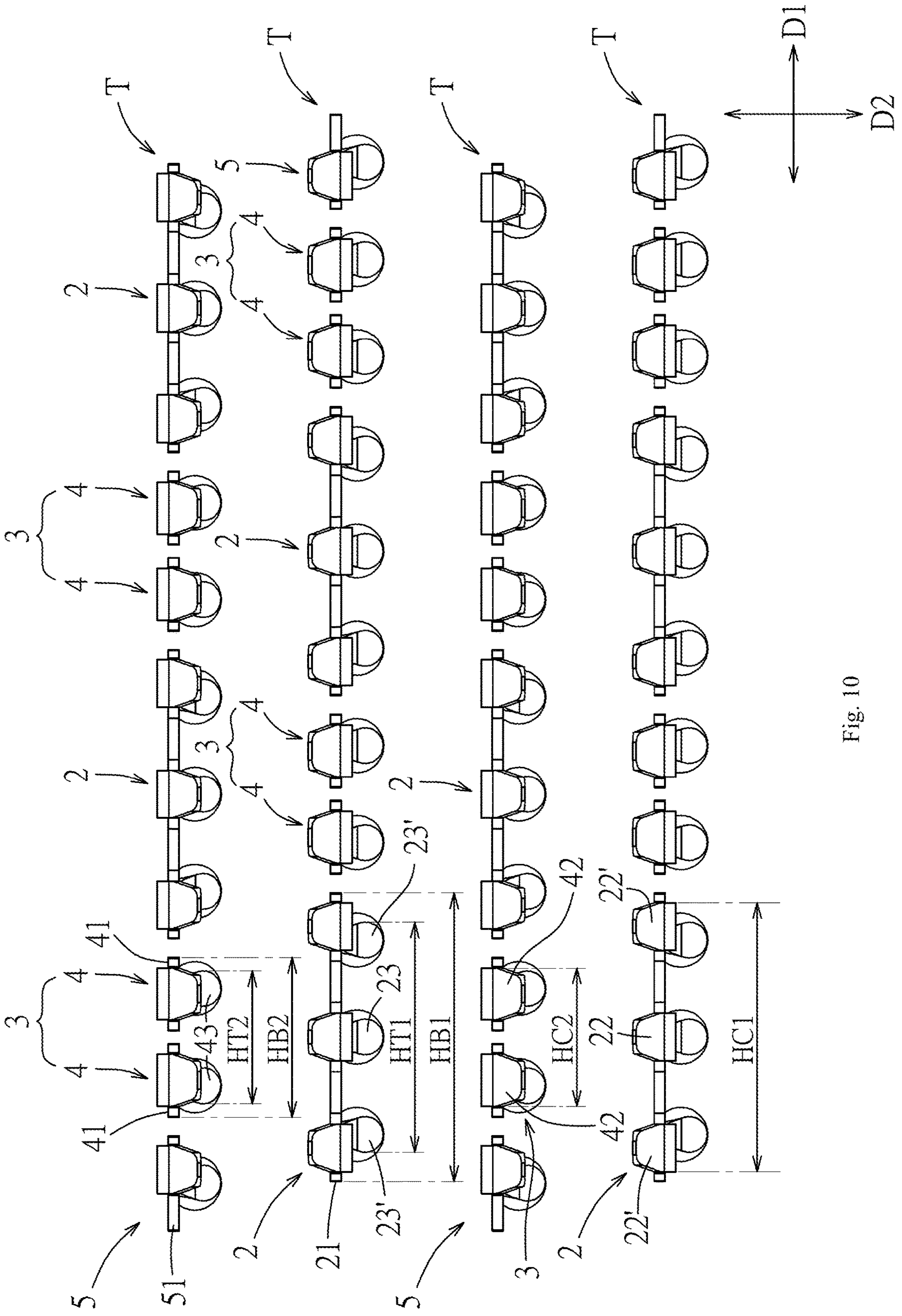
FIG. 10 is a top view of some of the plurality of terminal columns of the electrical connector of the first embodiment.

Referring to FIG. 5 and FIG. 10, in the two adjacent terminal columns T of the plurality of terminal columns T, an arrangement manner of one terminal column T is that one second ground terminal 5, one differential signal terminal pair 3, one first ground terminal 2, one differential signal terminal pair 3 and one first ground terminal 2 are arranged from left to right along the first direction D1, but an arrangement manner of the other terminal column T is that one first ground terminal 2, one differential signal terminal pair 3, one first ground terminal 2, one differential signal terminal pair 3 and one second ground terminal 5 are arranged from left to right along the first direction D1.

In the first embodiment, a total width HB2 of the two body portions 41 of each differential signal terminal pair 3 in the first direction D1 is less than a width HB1 of the body portion 21 of each first ground terminal 2 in the first direction D1. Here, the total width HB2 is a distance between opposite outer sides of the two body portions 41. In the two adjacent terminal columns T, orthographic projections of the two body portions 41 of each differential signal terminal pair 3 in the second direction D2 are positioned within a range defined by the width HB1 of the body portion 21 of the corresponding first ground terminal 2. A total width HC2 of the two elastic contact portions 42 of each differential signal terminal pair 3 in the first direction D1 is less than a total width HC1 of the two elastic contact portions 2T of each first ground terminal 2 in the first direction D1. Here, the total width HC2 is a distance between opposite outer sides of the two elastic contact portions 42, and the total width HC1 is a distance between opposite outer sides of the two elastic contact portions 22'. In the two adjacent terminal columns T, orthographic projections of the two elastic contact portions 42 of each differential signal terminal pair 3 in the second direction D2 are positioned within a range defined by the width HC1 of the two elastic contact portions 22' of the corresponding first ground terminal 2, and an orthographic projection of the elastic contact portion 22 positioned in the middle of each first around terminal 2 in the second direction D2 is positioned within a range defined by the width HC2 of the two elastic contact portions 42 of the corresponding differential signal terminal pair 3. A total width HT2 of the two tail portions 43 of each differential signal terminal pair 3 in the first direction D1 is less than a total width HT1 of the two tail portions 23' of each first ground terminal 2 in the first direction D1. Here, the total width HT2 is a distance between opposite outer sides of the two tail portions 43, and the total width HT1 is a distance between opposite outer sides of the two tail portions 23'. In the two adjacent terminal columns T, orthographic projections of the two tail portions 43 of each differential signal terminal pair 3 in the second direction D2 are positioned within a range defined by the width HT1 of the two tail portions 23' of the corresponding first ground terminal 2, and an orthographic projection of the tail portion 23 positioned in the middle of each first ground terminal 2 in the second direction D2 is positioned within a range defined by the width HT2 of the two tail portions 43 of the corresponding differential signal terminal pair 3.

By the design manner that the orthographic projection of the elastic contact portion 22 positioned in the middle of each first around terminal 2 in the second direction D2 is positioned within the range defined by the width HC2 of the two elastic contact portions 42 of the corresponding differential signal terminal pair 3 and the orthographic projection of the tail portion 23 positioned in the middle of each first ground terminal 2 in the second direction D2 is positioned within the range defined by the width HT2 of the two tail portions 43 of the corresponding differential signal terminal pair 3, a coupling amount when each differential signal terminal pair 3 and the corresponding first ground terminal 2 of the adjacent terminal column T are coupled can mainly focus on the elastic contact portion 22 positioned in the middle of the corresponding first ground terminal 2 and the tail portion 23 positioned in the middle of the corresponding first ground terminal 2, coupling amounts between each differential signal terminal pair 3 and the two elastic contact portions 22' and the two tail portions 23' positioned at the lateral edges of the corresponding first around terminal 2 can be further reduced, which does not easily cause crosstalk on the adjacent differential signal terminal pair 3 which is positioned in the same terminal column T as the two elastic contact portions 22' and the two tail portions 23'.

Because a width of the body portion 51 of each second ground terminal 5 in the first direction D1 is less than the width HB1 of the body portion 21 of each first ground terminal 2 in the first direction D1, so, by that the second ground terminal 5 is provided to be adjacent to the corresponding differential signal terminal pair 3 and be positioned at an outermost tip end position in each terminal column T, an entire width of each terminal column T in the first direction D1 and an entire width of the insulative base 1 in the first direction D1 can be reduced, so that an entire volume of the electrical connector 100 can be reduced.

Referring to FIG. 5, FIG. 6 and FIG. 7, each protruding bar 12 is provided with protruding blocks 14 integrally extending from each protruding bar 12 in the recessed avoiding portions 118 which respectively correspond to the elastic contact portion 42 of each signal terminal 4 and the elastic contact portion 22 positioned in the middle of each first ground terminal 2, so, an amount of the insulative plastic between the two elastic contact portions 42 of each differential signal terminal pair 3 and the elastic contact portion 22 positioned in the middle of the corresponding first ground terminal 2 in the two adjacent terminal columns T of the insulative base 1 can be increased, so as to promote the coupling effect between the two elastic contact portions 42 and the elastic contact portion 22, therefore, a coupling amount that each differential signal terminal pair 3 is coupled to the elastic contact portion 22 positioned in the middle of the corresponding first ground terminal 2 of the adjacent terminal column T is increased, the coupling amounts that each differential signal terminal pair 3 is coupled to the two elastic contact portions 22' positioned at the lateral edges of the corresponding first ground terminal 2 of the adjacent terminal column T can be further reduced.

It is noted that, by the manner that the protruding blocks 14 are provided in the recessed avoiding portions 118 which correspond to the elastic contact portions 42, 22, the amount of the insulative plastic between the elastic contact portions 42, 22 is increased, so that the coupling effect can be better. Certainly, the providing manner of the protruding block 14 of the first embodiment also may have following different variations as desired, and thus is not limited to the previous manner.

One manner is that each protruding bar 12 only provides the protruding block 14 in the recessed avoiding portion 118 which corresponds to the elastic contact portion 42 of each signal terminal 4.

Another manner is that each protruding bar 12 only provides the protruding block 14 in the recessed avoiding portion 118 which corresponds to the elastic contact portion 22 positioned in the middle of each first ground terminal 2.

Referring to FIG. 4, the insulative base 1 has two terminal providing zones Z1, Z2 which are spaced apart from each other along the first direction D1 and an isolating zone Z3 which is positioned between two terminal providing zones Z1, Z2. The protruding bars 12 and the inserting slots 13 of each terminal providing zone Z1, Z2 are arranged alternately along the second direction D2 to form one row, and the protruding bars 12 of one terminal providing zone Z1 of the two terminal providing zones Z1, Z2 respectively correspond to the inserting slots 13 of the other terminal providing zone Z2 of the two terminal providing zones Z1, Z2 in the first direction D1. In the first embodiment, the terminal columns T correspondingly provided in the one terminal providing zone Z1 of the two terminal providing zones Z1, Z2 are used to transmit a signal, the terminal columns T correspondingly provided in the other terminal providing zone Z2 of the two terminal providing zones Z1, Z2 are used to receive a signal, by that the isolating zone Z3 isolates the two terminal providing zones Z1, Z2 from each other, near end crosstalk isolation can be better, integrity of the signal is promoted.

Figure 11:
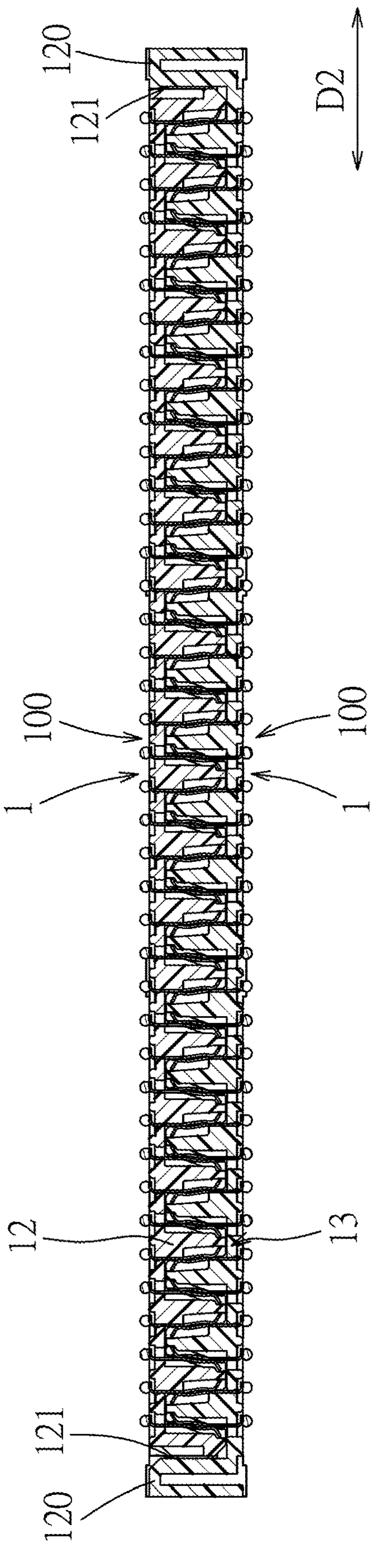
FIG. 11 is a cross sectional view taken along an XI-XI line of FIG. 1.

Referring to FIG. 2, FIG. 4 and FIG. 11, the first side 111 and the second side 112 of the insulative base 1 each are formed with a foolproof protruding portion 120 and a foolproof recessed portion 121 which are adjacent to each other. In the description herein, "foolproof" may be defined as an arrangement configured to reduce mating errors. Each foolproof protruding portion 120 of each electrical connector 100 is used to mate with the corresponding foolproof recessed portion 121 of the other electrical connector 100. The insulative base 1 further has a protruding rib 15 which is formed to the third side 113 and protrudes from the bottom wall 11, the protruding rib 15 extends along the second direction D2 and is an elongated rib. The protruding rib 15 of each electrical connector 100 is used to mate with the fourth side 114 of the other electrical connector 100. In the first embodiment, the protruding rib 15 extends to the first side 111 and the second side 112, and each foolproof recessed portion 121 is positioned between the protruding rib 15 and the corresponding foolproof protruding portion 120.

Referring to FIG. 1, FIG. 2 and FIG. 11, when the two electrical connectors 100 are to be mated with each other, firstly, the foolproof protruding portions 120 of one electrical connector 100 are respectively aliened with above the foolproof recessed portions 121 of the other electrical connector 100. Then, the one electrical connector 100 is moved toward the other electrical connector 100 and is mated with the other electrical connector 100. When the two electrical connectors 100 have been mated with each other, the foolproof protruding portions 120 of the one electrical connector 100 are respectively mated with and inserted into the foolproof recessed portions 121 of the other electrical connector 100, the protruding rib 15 of the one electrical connector 100 is mated with the fourth side 114 of the other electrical connector 100 and the foolproof protruding portions 120 and the protruding ribs 15 of the two electrical connectors 100 cooperate with each other to make a periphery edge of the two electrical connectors 100 closed, the protruding bars 12 of the one electrical connector 100 are respectively inserted into and mated with the inserting slots 13 of the other electrical connector 100.

By the design the foolproof protruding portions 120 and the foolproof recessed portions 121 of each electrical connector 100, wrong insertion can be prevented from occurring when the two electrical connectors 100 are mated with each other, and the protruding bars 12 of the two electrical connectors 100 respectively can be accurately inserted into and mated with the inserting slots 13 of the two electrical connectors 100.

By the manner that the protruding rib 15 extends to the first side 111 and the second side 112 and is spaced apart from the foolproof protruding portions 120 in each electrical connector 100, when each foolproof protruding portion 120 of the one electrical connector 100 is inserted into the corresponding foolproof recessed portion 121 of the other electrical connector 100, each foolproof protruding portion

120 of the one electrical connector 100 can be stopped by the corresponding foolproof protruding portion 120 and the protruding rib 15 of the other electrical connector 100 in the first direction D1, so as to prevent the two electrical connectors 100 from shaking along the first direction D1 and promote stability after the two electrical connectors 100 are mated with each other. Moreover, the protruding ribs 15 and the foolproof protruding portions 120 of the two electrical connectors 100 can cooperate with each other to constitute a closed periphery wall structure, which can function to protect the terminal columns T of the two electrical connectors 100 so as to prevent the terminals of the terminal columns T from being damaged due to wrong contacting of an external tool. In addition, because the lengths of the third side 113 and the fourth side 114 of the insulative base 1 along the second direction D2 are larger than the lengths of the first side 111 and the second side 112 along the first direction D1, by that the protruding rib 15 protrudes from the bottom wall 11 and is formed to the third side 113, structure strength of the insulative base 1 in a length direction can be promoted, which can reduce warpage deformation of the insulative base 1 generate in a process of passing through a soldering furnace, so as to promote the soldering quality between the terminals of the terminal columns T and a circuit board.

Figure 12:
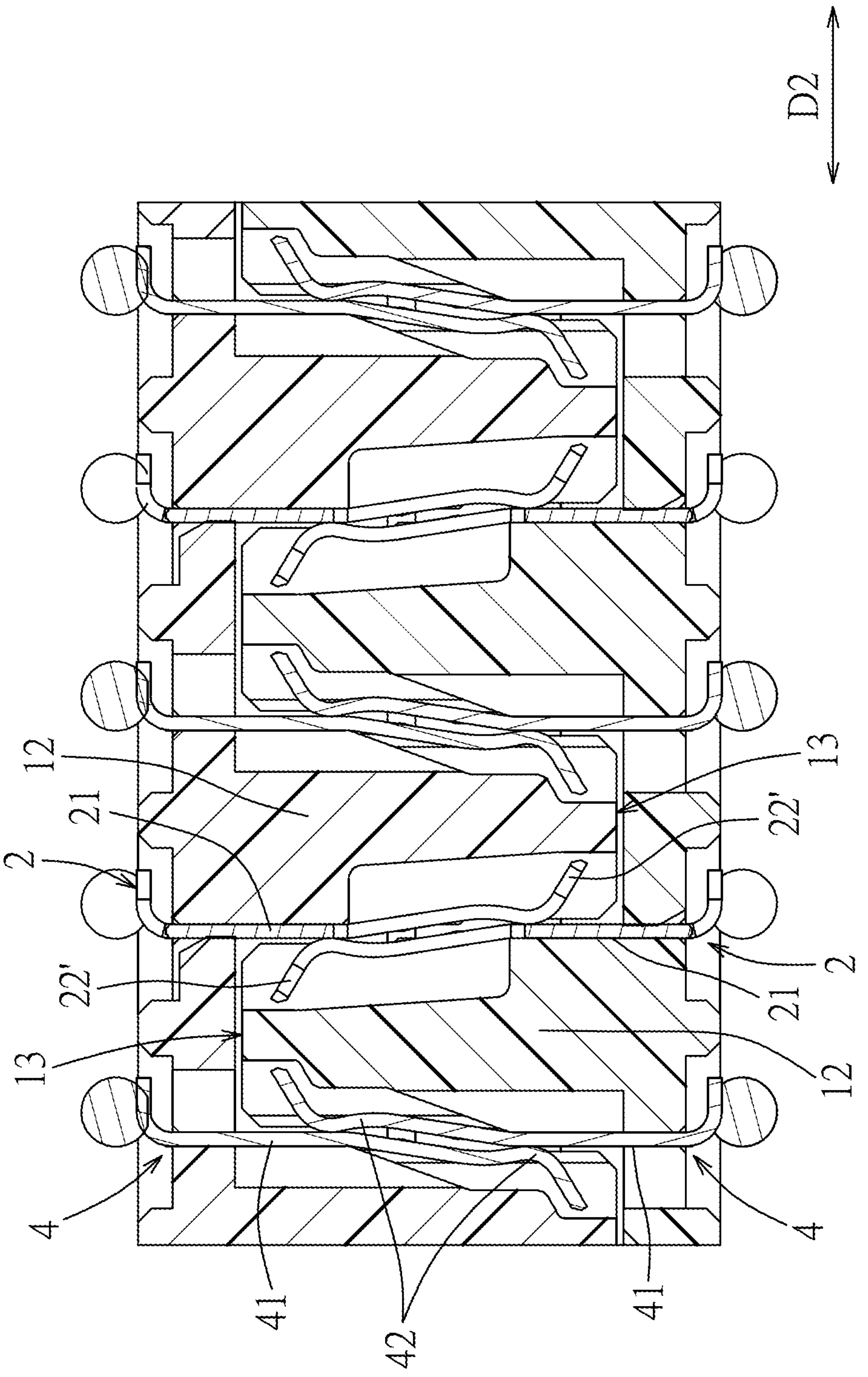
FIG. 12 is a partially enlarged view of FIG. 11.

Referring to FIG. 8, FIG. 11 and FIG. 12, when the two electrical connectors 100 are mated with each other, the corresponding first ground terminals 2, the corresponding signal terminals 4 and the corresponding second ground terminals 5 of the two electrical connectors 100 are mated with each other respectively. Here, the two corresponding first ground terminals 2 are mated with each other so that mating of each pair of the three pairs of the elastic contact portions 22, 22' of the two corresponding first ground terminals 2 forms two contact points, and the three pairs of the elastic contact portions 22, 22' totally form six contact points. The two corresponding signal terminals 4 are mated with each other so that mating of the elastic contact portions 42 forms two contact points. The two corresponding second ground terminals 5 are mated with each other so that mating of the elastic contact portions 52 forms two contact points. Specifically, in the two first ground terminals 2 mated with each other, each elastic contact portion 22, 22' of one first ground terminal 2 contacts the body portion 21 of the other first ground terminal 2 so as form one contact point, so that there are totally six contact points between the two first ground terminals 2 mated with each other, thereby assuring that stable electrical connection between the two first ground terminals 2 mated with each other can be maintained. In the two signal terminals 4 mated with each other, the elastic contact portion 42 of one signal terminal 4 contacts the body portion 41 of the other signal terminal 4 to form one contact point, so that there are totally two contact points between the two signal terminals 4 mated with each other, thereby assuring that stable electrical connection between the two signal terminals 4 mated with each other can be maintained. In the two second ground terminals 5 mated with each other, the elastic contact portion 52 of one second ground terminal 5 contacts the body portion 51 of the other second ground terminal 5 to form one contact point, so that there are totally two contact points between two second ground terminals 5 mated with each other, thereby assuring that stable electrical connection between the two second ground terminals 5 mated with each other can be maintained.

Figure 13:
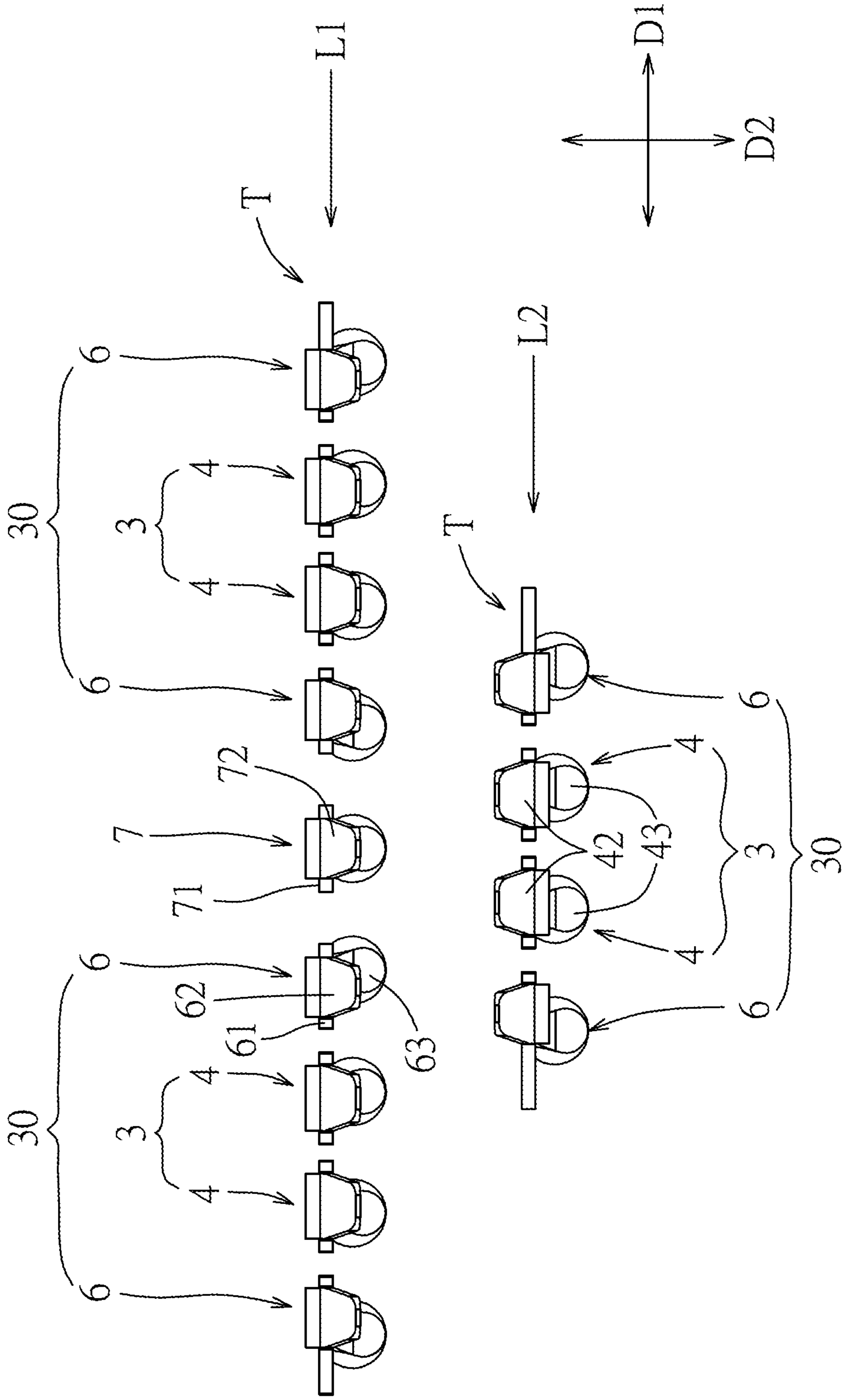
FIG. 13 is a top view of some of a plurality of terminal columns of an electrical connector of a second embodiment of the electrical connector assembly of the present disclosure.

Referring to FIG. 13, an entire structure of a second embodiment of the electrical connector assembly of the present disclosure is substantially the same as that of the first embodiment, but is different in the number of terminals and an arrangement manner of the terminals.

In the second embodiment, each electrical connector 100 includes at least three differential signal terminal groups 30, these differential signal terminal groups 30 are provided to the insulative base 1 (as shown in FIG. 4) and are staggeringly distributed in two columns which are substantially parallel to each other. In the three differential signal terminal groups 30, the two differential signal terminal groups 30 are provided to a first column L1 of the two columns and are arranged along the first direction D1, the other differential signal terminal group 30 is provided to a second column L2 of the two columns and is positioned between the two differential signal terminal groups 30 provided in the first column L1. The first column L1 and the second column L2 are arranged along the second direction D2 and are spaced apart from each other. Each differential signal terminal group 30 includes two first ground terminals 6 and one differential signal terminal pair 3 which are arranged side by side, the two first ground terminals 6 are respectively positioned at two outer sides of the differential signal terminal pair 3.

Each electrical connector 100 further includes at least one second ground terminal 7, the second ground terminal 7 is provided to the insulative base 1 and is positioned between the two differential signal terminal groups 30 provided in the first column L1, the second ground terminal 7 is adjacent to the two corresponding first ground terminals 6 of the two differential signal terminal groups 30 and faces the differential signal terminal pair 3 of the differential signal terminal group 30 provided in the second column L2.

An arrangement manner of the terminals in the first column L1 is that one first ground terminal 6, one differential signal terminal pair 3, one first ground terminal 6, one second around terminal 7, one first ground terminal 6, one differential signal terminal pair 3 and one first ground terminal 6 are arranged from left to right along the first direction D1, and an arrangement manner of the terminals in the second column L2 is that one first ground terminal 6, one differential signal terminal pair 3 and one first ground terminal 6 are arranged from left to right along the first direction D1.

Figure 9:
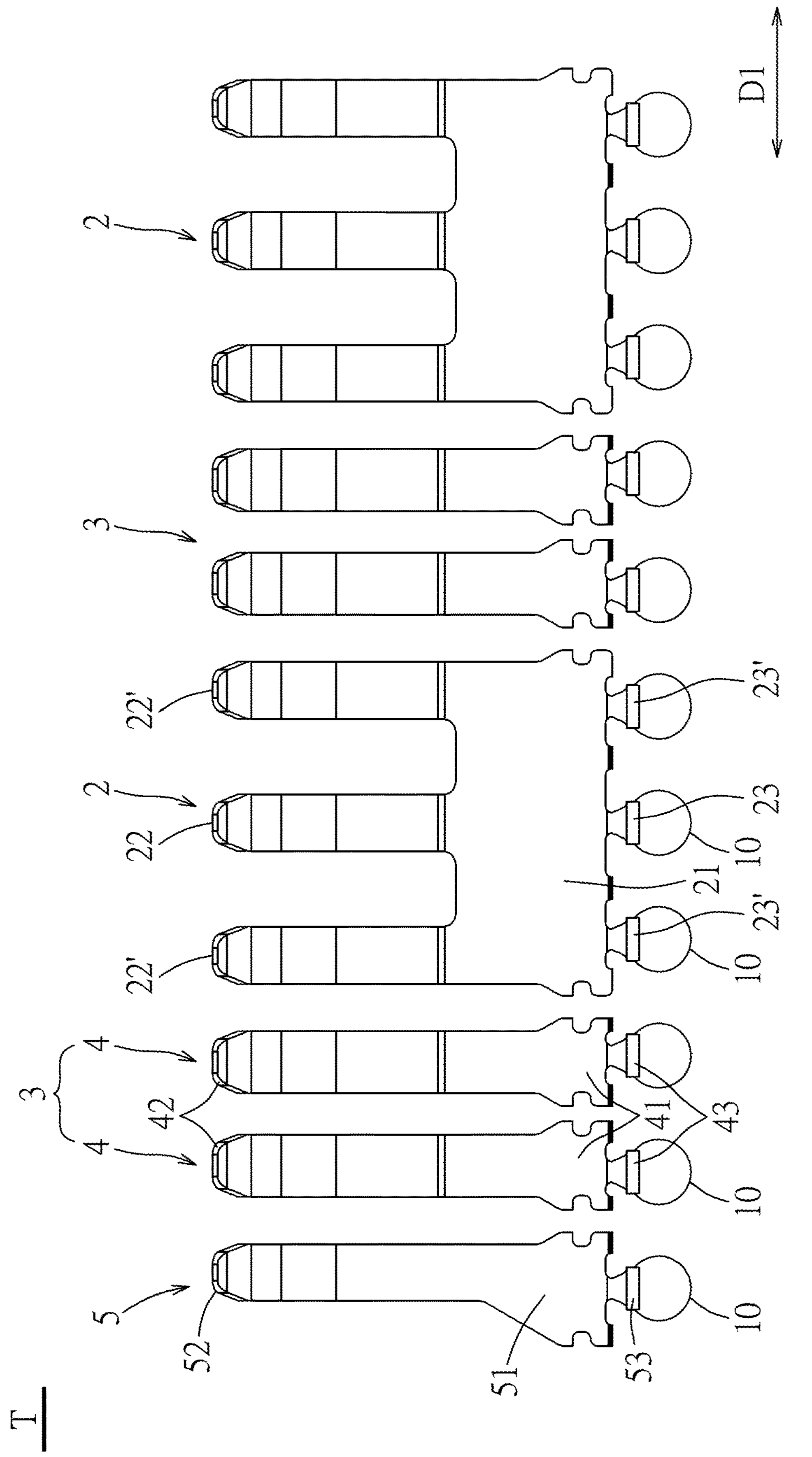
FIG. 9 is a front view of a terminal column of the electrical connector of the first embodiment.

In the second embodiment, a structure of the first ground terminal 6 and a structure of the second ground terminal 7 each are similar to the structure of the second ground terminal 5 of the first embodiment (as shown in FIG. 9), the first ground terminal 6 and the second ground terminal 7 each have a body portion 61, 71, an elastic contact portion 62, 72 and a tail portion 63, 73.

An orthographic projection of the elastic contact portion 72 of the second ground terminal 7 in the first column L1 in the second direction D2 is positioned within a range defined by a width of the two elastic contact portions 42 of the corresponding differential signal terminal pair 3 in the second column L2, an orthographic projection of the tail portion 73 of the second ground terminal 7 in the first column L1 in the second direction D2 is positioned within a range defined by a width of the two tail portions 43 of the corresponding differential signal terminal pair 3 in the second column L2, the width of the three elastic contact portions of a corresponding ground terminal 7 or 6, the width of three tail portions of the corresponding around terminal 7 or 6, or any combination thereof. Therefore, a coupling amount when the differential signal terminal pair 3 of the second column L2 is coupled with the second ground terminal 7 and the two first ground terminals 6 positioned at opposite sides of the second ground terminal 7 in the adjacent first column L1 can mainly focus on the elastic contact portion 72 and the tail portion 73 of the second ground terminal 7, which can reduce crosstalk between the differential signal terminal pairs 3 provided in the first column L1 and the differential signal terminal pair 3 provided in the second column L2.

It is noted that, in other implementing manners of the second embodiment, a structure of the first ground terminal 6 and a structure of the second ground terminal 7 also each may be similar to the structure of the first ground terminal 2 of the first embodiment (as shown in FIG. 9), so that the first ground terminal 6 and the second ground terminal 7 each have elastic contact portions and tail portions. Moreover, the number of the differential signal terminal group 30 and the number of the second ground terminal 7 in each electrical connector 100 also each may be more, by that the first column L1 of the terminals and the second column L2 of the terminals are repeatedly provided at a side of the second column L2 opposite to the first column L1 along the second direction D2, more terminal columns T similar to the first embodiment can be provided.

Figure 14:
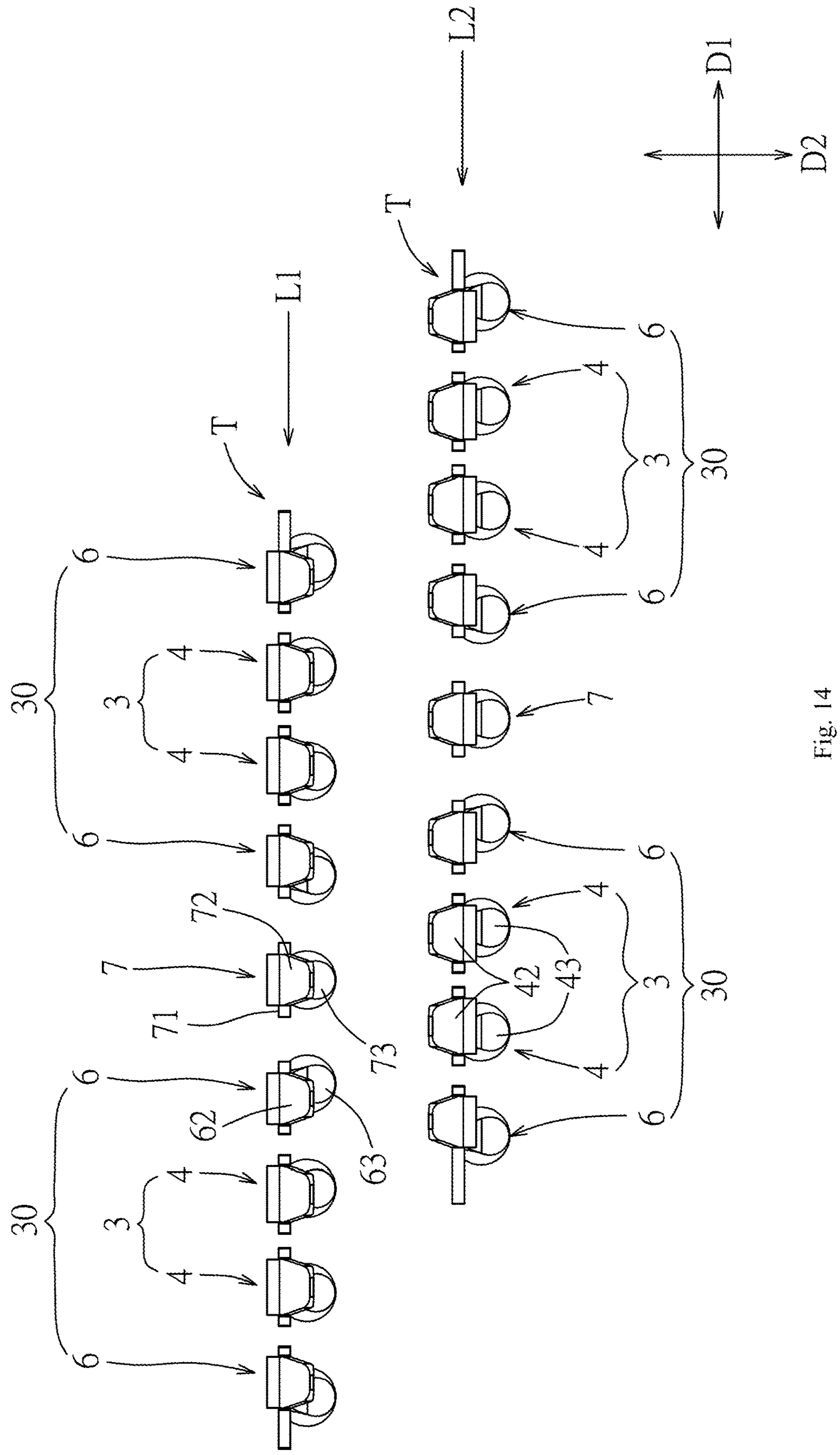
FIG. 14 is a top view of some of a plurality of terminal columns of an electrical connector of a third embodiment of the electrical connector assembly of the present disclosure.

Referring to FIG. 14, an entire structure of a third embodiment of the electrical connector assembly of the present disclosure is substantially the same as that of the second embodiment, but is different in the number of terminals and an arrangement manner of the terminals.

In the third embodiment, the number of the differential signal terminal group 30 is four as an example, the number of the second ground terminal 7 is two as an example. An arrangement manner of the terminals in the first column L1 is the same as that in the second embodiment. An arrangement manner of the terminals in the other and second column L2 is that one first ground terminal 6, one differential signal terminal pair 3, one first ground terminal 6, one second ground terminal 7, one first ground terminal 6, one differential signal terminal pair 3 and one first ground terminal 6 are arranged from left to right along the first direction D1.

Figure 15:
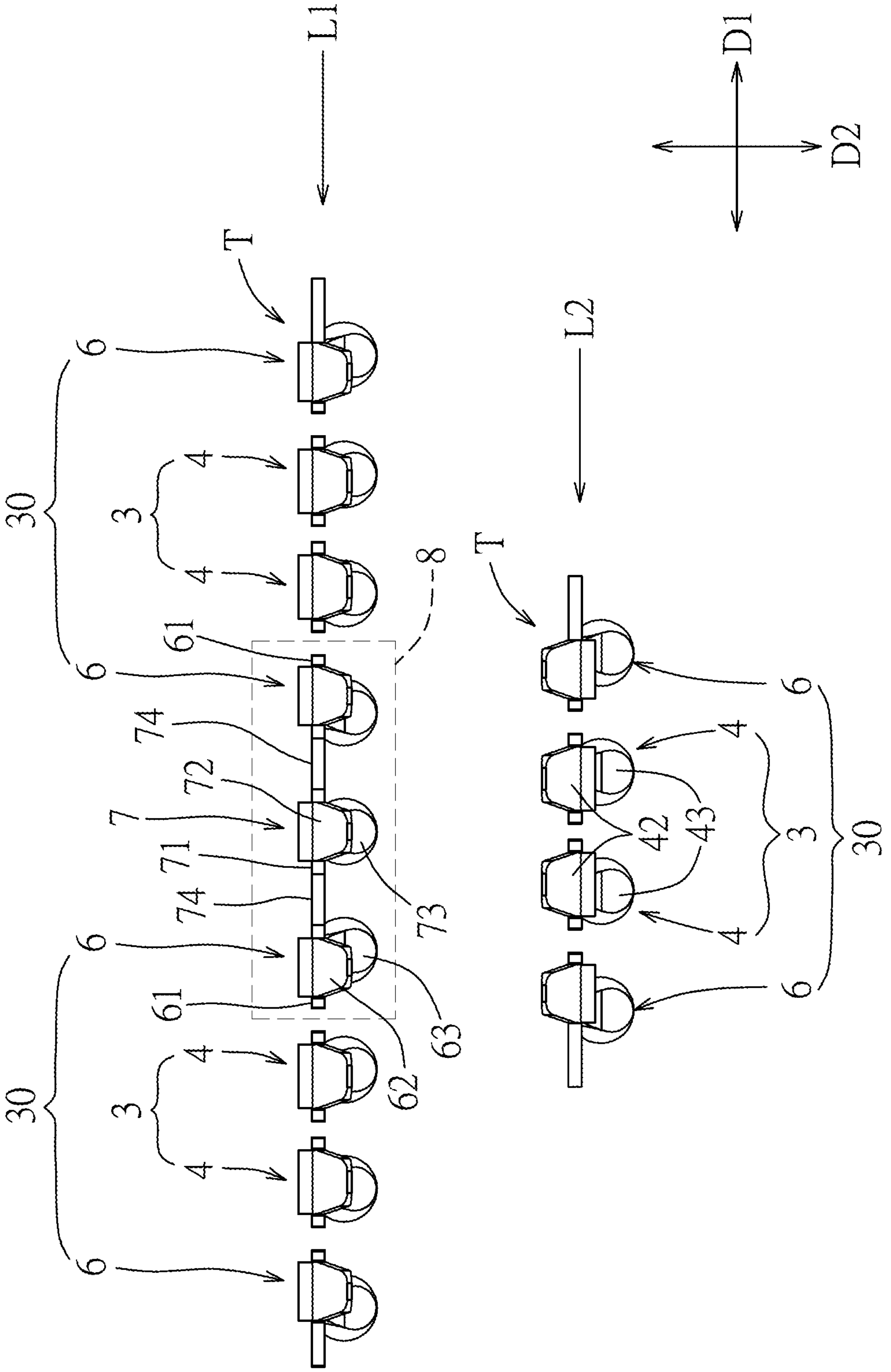
FIG. 15 is a top view of some of a plurality of terminal columns of an electrical connector of a fourth embodiment of the electrical connector assembly of the present disclosure.

Referring to FIG. 15, an entire structure of a fourth embodiment of the electrical connector assembly of the present disclosure is substantially the same as that of the second embodiment, but is different in a structure of a terminal.

In the fourth embodiment, the second ground terminal 7 further has two connecting portions 74 which respectively protrude from opposite sides of the body portion 71, the two connecting portions 74 are integrally respectively connected with the two body portions 61 of the two adjacent first ground terminals 6 so as to together constitute a ground terminal 8 which is the same as the first ground terminal 2 of the first embodiment (as shown in FIG. 9) in structure.

It is noted that, in other implementing manners of the fourth embodiment, the number of the tail portion 63, 73 of the ground terminal 8 also may be one or two, so that the second ground terminal 7 and the two first ground terminals 6 connected with each other share the one tail portion or the two tail portions.

In conclusion, by the design of the elastic contact portion 22 and the tail portion 23 of each first ground terminal 2 of the first embodiment and by the design of the elastic contact portion 72 and the tail portion 73 of the second ground terminal 7 of the second, third and fourth embodiments, crosstalk between the differential signal terminal pairs 3 of adjacent terminal columns T can be reduced, integrity of the signal is increased. Moreover, the protruding rib 15 can promote the structure strength of the insulative base 1 in a length direction, which can reduce warpage deformation of the insulative base 1 generated in the process of passing through the soldering furnace, so as to promote the soldering quality between the terminals of the terminal columns T and the circuit board, which indeed can attain the object of the present disclosure.

However, what is described above is just the embodiments of the present disclosure, which is not intended to limit the scope implementing the present disclosure, any simple equivalent variations and modifications made according to the claims and the specification of the present disclosure will also be fallen within the scope of the present disclosure.

What is claimed is:

1. An electrical connector, comprising:
- an insulative base; and
- a plurality of terminal columns provided to the insulative base, each terminal column comprising a plurality of ground terminals and a plurality of differential signal terminal pairs, the plurality of ground terminals and the plurality of differential signal terminal pairs being arranged alternately along a first direction, the plurality of terminal columns being arranged along a second direction substantially perpendicular to the first direction and being spaced apart from each other;
- each ground terminal having a body portion and three elastic contact portions which extend from the body portion and are spaced apart from each other;
- each differential signal terminal pair being composed of two signal terminals, each signal terminal having a body portion and an elastic contact portion which extends from the body portion; and
- in two adjacent terminal columns, orthographic projections of two elastic contact portions of each differential signal terminal pair in the second direction being positioned within a range defined by a width of the three elastic contact portions of a corresponding ground terminal, and an orthographic projection of an elastic contact portion positioned in a middle of each ground terminal in the second direction being positioned within a range defined by a width of the two elastic contact portions of a corresponding differential signal terminal pair.

2. The electrical connector of claim 1, wherein
- each ground terminal further has three tail portions which extend from the body portion and are spaced apart from each other, the three tail portions and the three elastic contact portions of each ground terminal respectively extend from two opposite ends of the body portion;
- each signal terminal of each differential signal terminal pair further has a tail portion which extends from the body portion, the tail portion and the elastic contact portion of each signal terminal respectively extend from two opposite ends of the body portion; and
- in the two adjacent terminal columns, orthographic projections of the two tail portions of each differential signal terminal pair in the second direction are positioned within a range defined by a width of the three tail portions of the corresponding ground terminal, and an orthographic projection of the tail portion positioned in a middle of each ground terminal in the second direction is positioned within a range defined by a width of the two tail portions of the corresponding differential signal terminal pair.

3. The electrical connector of claim 1, wherein
- the insulative base has a bottom wall, the bottom wall has a first side and a second side which are substantially parallel to the first direction and positioned at two opposite ends of the bottom wall;

the insulative base further has a plurality of protruding bars which are substantially parallel to each other, are spaced apart from each other, protrude from the bottom wall, are positioned between the first side and the second side, extend along the first direction, and are elongated;

the bottom wall and the plurality of protruding bars together define a plurality of inserting slots, the plurality of protruding bars and the plurality of inserting slots are arranged alternately along the second direction; and the insulative base further has a wall surface of each protruding bar adjacent to one of the plurality of inserting slots to be provided with a plurality of ground terminals grooves which respectively receive the plurality of ground terminals of each terminal column and signal terminal grooves which respectively receive the signal terminals of each terminal column.

4. The electrical connector of claim 3, wherein the insulative base further has recessed avoiding portions which respectively correspond to the elastic contact portions of the plurality of ground terminals of each terminal column in position and recessed avoiding portions which respectively correspond to the elastic contact portions of the signal terminals of each terminal column in position; and each protruding bar is provided with protruding blocks integrally extending from each protruding bar in the recessed avoiding portions.

5. The electrical connector of claim 3, wherein the first side and the second side of the insulative base each are formed with a protruding portion and a recessed portion which are adjacent to each other.

6. The electrical connector of claim 3, wherein the bottom wall has a third side and a fourth side which are substantially parallel to the second direction and are positioned at two opposite ends of the bottom wall; and the insulative base further has a protruding rib which is formed to the third side and protrudes from the bottom wall.

7. The electrical connector of claim 6, wherein the protruding rib extends to the first side and the second side; and the first side and the second side of the insulative base each are formed with a protruding portion and a recessed portion which are adjacent to each other, the recessed portion is positioned between the protruding rib and the protruding portion.

8. The electrical connector of claim 3, wherein the insulative base has two terminal providing zones which are spaced apart from each other along the first direction and an isolating zone which is positioned between the two terminal providing zones; and the plurality of protruding bars and the plurality of inserting slots of each terminal providing zone are arranged alternately along the second direction, and the plurality of protruding bars of one terminal providing zone of the two terminal providing zones respectively correspond to the plurality of inserting slots of the other terminal providing zone of the two terminal providing zones in the first direction.

9. The electrical connector of claim 1, wherein the plurality of ground terminals are first ground terminals;

each terminal column further comprises a second ground terminal, the second ground terminal has a body portion and an elastic contact portion which extends from the body portion; and in the two adjacent terminal columns of the plurality of terminal columns, an arrangement manner of one terminal column is that one second ground terminal, one differential signal terminal pair, one first ground terminal, one differential signal terminal pair and one first ground terminal are arranged from left to right along the first direction, and an arrangement manner of the other terminal column is that one first ground terminal, one differential signal terminal pair, one first ground terminal, one differential signal terminal pair and one second ground terminal are arranged from left to right along the first direction.

10. The electrical connector of claim 1, wherein the plurality of ground terminals are first ground terminals; and each terminal column further comprises a second ground terminal, the second ground terminal has a body portion and an elastic contact portion which extend from the body portion, the second ground terminal is provided to be adjacent to the corresponding differential signal terminal pair and be positioned at an outermost tip end position in each terminal column.

11. The electrical connector of claim 1, wherein the insulative base has a first side and a second side which are substantially parallel to the first direction and are positioned at two opposite ends of the insulative base, a third side and a fourth side which are substantially parallel to the second direction and are positioned at two opposite ends of the insulative base, and a protruding rib which is formed to the third side; and lengths of the first side and the second side along the first direction are shorter than lengths of the third side and the fourth side along the second direction.

12. An electrical connector assembly, comprising:

two electrical connectors which are mated with each other;

each electrical connector comprising:

an insulative base; and a plurality of terminal columns provided to the insulative base, each terminal column comprising a plurality of ground terminals and a plurality of differential signal terminal pairs, the plurality of ground terminals and the plurality of differential signal terminal pairs being arranged alternately along a first direction, the plurality of terminal columns being arranged along a second direction substantially perpendicular to the first direction and being spaced apart from each other;

each ground terminal having a body portion and three elastic contact portions which extend from the body portion and are spaced apart from each other;

each differential signal terminal pair being composed of two signal terminals, each signal terminal having a body portion and an elastic contact portion which extends from the body portion; and in two adjacent terminal columns, orthographic projections of two elastic contact portions of each differential signal terminal pair in the second direction being positioned within a range defined by a width of the three elastic contact portions of a corresponding ground terminal, and an orthographic projection of an elastic contact portion positioned in a middle of each ground terminal in the second direction being positioned within a range defined by a width of the two elastic contact portions of the corresponding differential signal terminal pair.

13. The electrical connector assembly of claim 12, wherein each ground terminal further has three tail portions which extend from the body portion and are spaced apart from each other, the three tail portions and the three elastic contact portions of each ground terminal respectively extend from two opposite ends of the body portion;

each signal terminal of each differential signal terminal pair further has a tail portion which extends from the body portion, the tail portion and the elastic contact portion of each signal terminal respectively extend from two opposite ends of the body portion; and in two adjacent terminal columns, orthographic projections of two tail portions of each differential signal terminal pair in the second direction are positioned within a range defined by a width of the three tail portions of a corresponding ground terminal, and an orthographic projection of the tail portion positioned in a middle of each ground terminal in the second direction is positioned within a range defined by a width of the two tail portions of the corresponding differential signal terminal pair.

14. The electrical connector assembly of claim 12, wherein the insulative base has a bottom wall, the bottom wall has a first side and a second side which are substantially parallel to the first direction and positioned at two opposite ends of the bottom wall;

the insulative base further has a plurality of protruding bars which are substantially parallel to each other, are spaced apart from each other, protrude from the bottom wall, are positioned between the first side and the second side, extend along the first direction, and are elongated;

the bottom wall and the plurality of protruding bars together define a plurality of inserting slots, the plurality of protruding bars and the plurality of inserting slots are arranged alternately along the second direction; and the insulative base further has a wall surface of each protruding bar adjacent to one of the plurality of the inserting slots to be provided with a plurality of ground terminals grooves which respectively receive the plurality of ground terminals of each terminal column and signal terminal grooves which respectively receive the signal terminals of each terminal column.

15. The electrical connector assembly of claim 14, wherein with the two electrical connectors mated with each other, the protruding bars of one electrical connector are correspondingly inserted into the inserting slots of the other electrical connector respectively.

16. The electrical connector assembly of claim 14, wherein the insulative base further has recessed avoiding portions which respectively correspond to the elastic contact portions of the plurality of ground terminals of each terminal column in position and recessed avoiding portions which respectively correspond to the elastic contact portions of the signal terminals of each terminal column in position; and each protruding bar is provided with protruding blocks integrally extending from each protruding bar in the recessed avoiding portions.

17. The electrical connector assembly of claim 14, wherein the bottom wall has a third side and a fourth side which are substantially parallel to the second direction and are positioned at two opposite ends of the bottom wall; and the insulative base further has a protruding rib which is formed to the third side and protrudes from the bottom wall.

18. The electrical connector assembly of claim 17, wherein the protruding rib extends to the first side and the second side; and the first side and the second side of the insulative base each are formed with a protruding portion and a recessed portion which are adjacent to each other, the recessed portion is positioned between the protruding rib and the protruding portion.

19. An electrical connector assembly, comprising:

two electrical connectors which are mated with each other;

each electrical connector comprising:

an insulative base; and a plurality of terminal columns provided to the insulative base, each terminal column comprising a plurality of ground terminals and a plurality of differential signal terminal pairs, the plurality of ground terminals and the plurality of differential signal terminal pairs being arranged alternately along a first direction, the plurality of terminal columns being arranged along a second direction substantially perpendicular to the first direction and being spaced apart from each other;

the insulative base having a bottom wall, the bottom wall having a first side and a second side which are substantially parallel to the first direction and positioned at two opposite ends of the bottom wall;

the insulative base further having a plurality of protruding bars which are substantially parallel to each other, are spaced apart from each other, protrude from the bottom wall, are positioned between the first side and the second side, extend along the first direction, and are elongated;

the bottom wall and the plurality of protruding bars together defining a plurality of inserting slots;

the insulative base having two terminal providing zones which are spaced apart from each other along the first direction by an isolating zone, the isolating zone being positioned between a first terminal providing zone of the two terminal providing zones to transmit and a second terminal providing zone of the two terminal providing zones to receive; and the protruding bars and the inserting slots of each terminal providing zone being arranged alternately along the second direction, and the protruding bars of one terminal providing zone of the two terminal providing zones respectively corresponding to the inserting slots of the other terminal providing zone of the two terminal providing zones in the first direction.

* * * * *